United States Patent
Onodera et al.

(10) Patent No.: US 10,434,691 B2
(45) Date of Patent: Oct. 8, 2019

(54) FOAM MOLDED ARTICLE AND MOLDING METHOD FOR SAME

(71) Applicant: KYORAKU CO., LTD., Kyoto (JP)

(72) Inventors: Masaaki Onodera, Kanagawa (JP); Naoto Tani, Aichi (JP)

(73) Assignee: KYORAKU CO., LTD., Kyoto-shi, Kyoto (JP)

(*) Notice: Subject to any disclaimer, the term of this patent is extended or adjusted under 35 U.S.C. 154(b) by 656 days.

(21) Appl. No.: 14/434,110

(22) PCT Filed: Sep. 19, 2013

(86) PCT No.: PCT/JP2013/075364
§ 371 (c)(1),
(2) Date: Apr. 8, 2015

(87) PCT Pub. No.: WO2014/057786
PCT Pub. Date: Apr. 17, 2014

(65) Prior Publication Data
US 2015/0258718 A1    Sep. 17, 2015

(30) Foreign Application Priority Data

Oct. 10, 2012 (JP) ................ 2012-225174
Nov. 7, 2012 (JP) ................ 2012-245778

(51) Int. Cl.
*E04F 17/04* (2006.01)
*F01N 1/24* (2006.01)
(Continued)

(52) U.S. Cl.
CPC ........ *B29C 44/105* (2013.01); *B29C 44/0446* (2013.01); *B29C 44/08* (2013.01);
(Continued)

(58) Field of Classification Search
CPC ... B29C 49/22; B29K 2105/04; Y10S 138/09; Y10T 428/1376
(Continued)

(56) References Cited

U.S. PATENT DOCUMENTS 4,874,649 A * 10/1989 Daubenbuchel ........ B29C 49/22
                                                    138/137
9,057,533 B2 * 6/2015 Koizumi ................. F24F 13/24
(Continued)

FOREIGN PATENT DOCUMENTS

CN       102431146       5/2012
EP       1 674 244       6/2006
(Continued)

OTHER PUBLICATIONS

Official Action, along with English-language translation thereof, issued in KR Appl. No. 10-2017-7020684 dated Oct. 10, 2017.
(Continued)

*Primary Examiner* — Ellen S Wood
(74) *Attorney, Agent, or Firm* — Maier & Maier, PLLC

(57) ABSTRACT

Generation of a balloon-shaped air bubble is suppressed.
A foam molded article according to a mode of the present disclosure is characterized in that in a situation of being divided into two equal parts in the thickness direction T of the foam molded article, the average cell diameter $\alpha 1$ in the thickness direction T on the inner surface side A of the foam molded article is 1.2 times (($\alpha 1/\beta 1$)=1.2) or greater of the average cell diameter $\beta 1$ in the thickness direction T on the outer surface side B of the foam molded article and that the surface roughness Sm of the inner surface of the foam molded article is 1000 μm or greater.

3 Claims, 19 Drawing Sheets

(51) Int. Cl.

| | |
|---|---|
| *B29C 49/00* | (2006.01) |
| *B29C 44/10* | (2006.01) |
| *C08J 9/06* | (2006.01) |
| *B29C 44/04* | (2006.01) |
| *B29C 44/08* | (2006.01) |
| *B60H 1/00* | (2006.01) |
| *B29C 49/04* | (2006.01) |
| *B29L 31/30* | (2006.01) |
| *B29L 23/00* | (2006.01) |
| *B29K 105/04* | (2006.01) |
| *B29C 49/58* | (2006.01) |
| *B29K 23/00* | (2006.01) |
| *B29L 31/00* | (2006.01) |
| *B29C 48/30* | (2019.01) |
| *B29C 48/07* | (2019.01) |
| *B29C 48/00* | (2019.01) |
| *B29C 48/31* | (2019.01) |
| *B29C 48/375* | (2019.01) |
| *B29C 48/90* | (2019.01) |

(52) U.S. Cl.
CPC ............ B60H 1/00564 (2013.01); C08J 9/06 (2013.01); *B29C 48/0017* (2019.02); *B29C 48/07* (2019.02); *B29C 48/30* (2019.02); *B29C 48/31* (2019.02); *B29C 48/388* (2019.02); *B29C 48/906* (2019.02); *B29C 49/0031* (2013.01); *B29C 49/04* (2013.01); *B29C 2049/0057* (2013.01); *B29C 2049/047* (2013.01); *B29C 2049/5803* (2013.01); *B29C 2049/5837* (2013.01); *B29C 2049/5841* (2013.01); *B29K 2023/12* (2013.01); *B29K 2105/04* (2013.01); *B29K 2105/041* (2013.01); *B29K 2995/0072* (2013.01); *B29L 2023/004* (2013.01); *B29L 2023/22* (2013.01); *B29L 2031/30* (2013.01); *B29L 2031/3032* (2013.01); *B29L 2031/772* (2013.01); *C08J 2201/03* (2013.01); *C08J 2205/04* (2013.01); *C08J 2323/12* (2013.01); *Y10T 428/1376* (2015.01); *Y10T 428/24355* (2015.01)

(58) Field of Classification Search
USPC ....................... 428/36.5, 34.1; 425/523, 532
See application file for complete search history.

(56) References Cited

U.S. PATENT DOCUMENTS

| | | |
|---|---|---|
| 2006/0134396 A1 | 6/2006 | Blanton et al. |
| 2012/0060960 A1 | 3/2012 | Sumi et al. |
| 2012/0061886 A1 | 3/2012 | Sumi et al. |
| 2015/0290868 A1 | 10/2015 | Tanji |

FOREIGN PATENT DOCUMENTS

| | | |
|---|---|---|
| JP | 63-309434 | 12/1988 |
| JP | 6-266364 | 9/1994 |
| JP | 2004-116959 | 4/2004 |
| JP | 2005-241157 | 9/2005 |
| JP | 2010-240892 | 10/2010 |
| JP | 2011-131776 | 7/2011 |

OTHER PUBLICATIONS

Search report from International Bureau of WIPO, Application No. PCT/JP2013/075364, dated is Dec. 3, 2013.
Office Action in counterpart China Appl. No. 2017111798894 dated Oct. 16, 2018, with English language translation thereof.

* cited by examiner

FIG. 7
(a)
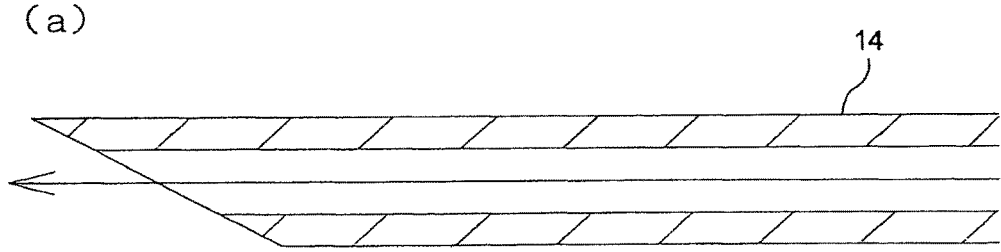
(b)
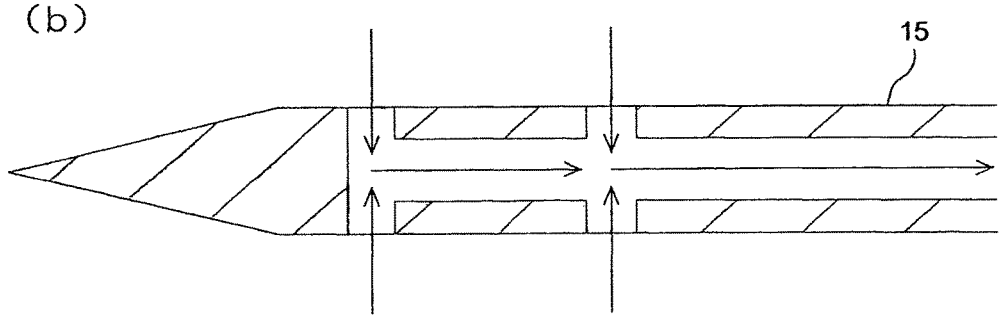

FIG. 13

| | APPLYING TIME (SECOND) | CELL RATIO | ROUGHNESS Sm (μm) | FOAMING MAGNIFICATION | BALLOON PHENOMENON |
|---|---|---|---|---|---|
| IMPLEMENTATION EXAMPLE 1 | 15 | 96.1μm/62.2μm = 1.55 | 1227 | 2.8 | O |
| IMPLEMENTATION EXAMPLE 2 | 25 | 89.3μm/63.8μm = 1.40 | 1187 | 2.8 | O |
| IMPLEMENTATION EXAMPLE 3 | 35 | 81.1μm/64.9μm = 1.25 | 1068 | 2.8 | O |
| IMPLEMENTATION EXAMPLE 4 | 35 | 80.7μm/61.6μm = 1.31 | 1049 | 2.0 | O |
| IMPLEMENTATION EXAMPLE 5 | 45 | 76.5μm/61.2μm = 1.25 | 1024 | 2.0 | O |
| IMPLEMENTATION EXAMPLE 6 | 35 | 89.6μm/68.9μm = 1.30 | 1237 | 3.5 | O |
| IMPLEMENTATION EXAMPLE 7 | 45 | 81.7μm/66.4μm = 1.23 | 1051 | 3.5 | O |
| IMPLEMENTATION EXAMPLE 8 | 15 | 110.0μm/85.0μm = 1.29 | 1287 | 4.0 | O |
| COMPARISON EXAMPLE 1 | 45 | 72.3μm/66.3μm = 1.09 | 1027 | 2.8 | × |
| COMPARISON EXAMPLE 2 | 55 | 66.1μm/76.1μm = 0.87 | 768 | 2.8 | × |
| COMPARISON EXAMPLE 3 | 55 | 72.3μm/65.1μm = 1.11 | 688 | 2.0 | × |
| COMPARISON EXAMPLE 4 | 55 | 71.9μm/69.8μm = 1.03 | 856 | 3.5 | × |

FOAM MOLDED ARTICLE AND MOLDING METHOD FOR SAME

TECHNICAL FIELD

The present disclosure relates to a foam molded article molded from foamed resin in a molten state and, in particular, to a foam molded article in which a plate-shaped part such as a flange is connected to a tube body.

BACKGROUND ART

For example, in ducts or the like, foam molded articles are widely used in which plate-shaped parts such as flanges are connected to a tube body.

In particular, in ducts used for delivering air from an air-conditioner, when tube-shaped foam molded articles are employed, lightweight ducts having a satisfactory thermal insulation property can be realized. Further, in such ducts, when the foaming magnification at the time of molding is increased so that air bubbles in the inside of the foam article are increased, thermal insulation property and the weight reduction can be improved. Thus, such a configuration is more effective.

For example, foam molded articles of this kind are molded by mold clamping of foamed resin in a molten state by using split metallic molds. In recent years, in association with improvement in molding techniques, mass production of foam molded articles with an increased foaming magnification is becoming achievable.

Further, Patent Document 1 (Japanese Patent Laid-open Publication No. 2011-131776) which is a technical literature filed by the present applicant discloses a technique that two resin sheets having different foaming magnifications to each other are mold-clamped by split metallic molds so that a foam molded article having a tube body and a plate-shaped part is molded.

PRIOR ART REFERENCE

Patent Document

Patent Document 1: Japanese Patent Laid-Open Publication No. 2011-131776

SUMMARY OF INVENTION

Problems to be Solved by the Invention

Nevertheless, as shown in FIG. 23, when a plate-shaped part Y8 is provided and connected to a tube body X8, in many cases, a predetermined structural strength is requested in order that the plate-shaped part Y8 may be reliably connected to another member.

Thus, when it is intended that the foaming magnification of the tube body X8 is increased at the time of molding of the foam molded article and a high structural strength is imparted to the plate-shaped part Y8, at the time of mold clamping by the split metallic molds, the plate-shaped part Y8 is to be pressed so that air bubbles in the foamed resin of the plate-shaped part Y8 are to be crushed.

There is a space on the inner side of the tube body X8. Thus, when the plate-shaped part Y8 is strongly pressed, air bubbles in the foamed resin of the plate-shaped part Y8 move toward the tube body X8 owing to a pressing force Z caused by mold clamping. Thus, as a result of mold clamping by the split metallic molds, many air bubbles are easily collected in the portion of the tube body X8 and then a balloon-shaped air bubble 81 is formed from the air bubbles on the inner side of the tube body X8. The present inventor has found these facts. Here, in the portion of the tube body X8 to which the plate-shaped part Y8 is connected, many air bubbles are easily collected and hence a balloon-shaped air bubble 81 is easily formed from the air bubbles. However, even in the portion of the tube body X8 to which the plate-shaped part Y8 is not connected, a balloon-shaped air bubble 81 is formed in a site where many air bubbles are easily collected by mold clamping or the like.

When a balloon-shaped air bubble 81 is generated, the inner side shape of the tube body X8 becomes a different shape from the design. As a result, the flow rate efficiency of the fluid flowing through the inside is degraded. Further, abnormal sound or vibrations are caused.

An object of the present disclosure is to suppress generation of a balloon-shaped air bubble.

Means for Solving to the Problems

The foam molded article according to a mode of the present disclosure is characterized in that in a situation of being divided into two equal parts in a thickness direction of the foam molded article, an average cell diameter in the thickness direction on an inner surface side of the foam molded article is 1.2 times or greater of an average cell diameter in the thickness direction on an outer surface side of the foam molded article and that a surface roughness Sm of the inner surface of the foam molded article is 1000 μm or greater.

Advantageous Effects of the Invention

Generation of a balloon-shaped air bubble can be suppressed.

BRIEF DESCRIPTION OF THE DRAWINGS

FIG. 7 is sectional views showing passages in (a) a bamboo spear needle and (b) a rocket needle.

FIG. 13 is a diagram showing a test result of an implementation example.

DESCRIPTION OF THE EMBODIMENTS (Outlines of Foam Molded Article 1 According to Mode of Present Disclosure)

Figure 1:
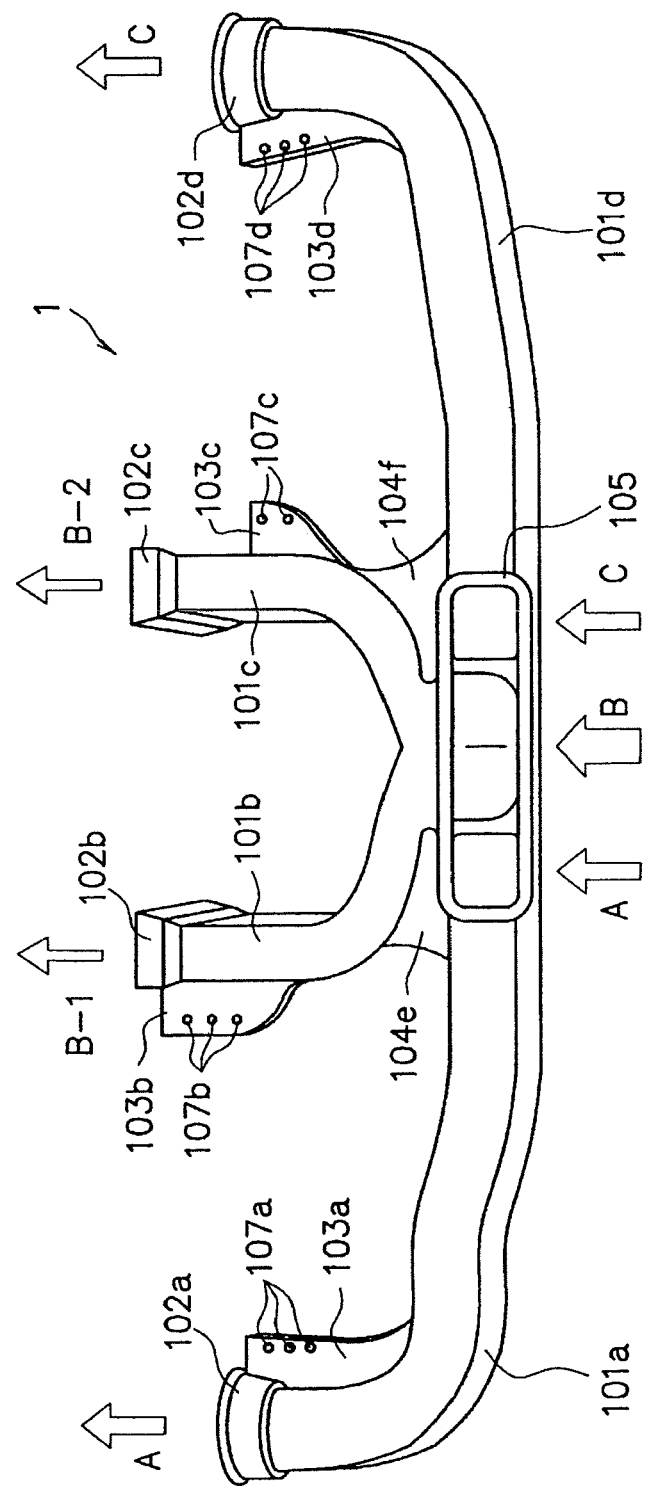
FIG. 1 is a diagram showing an instrument panel duct 1 of the present embodiment.
Figure 4:
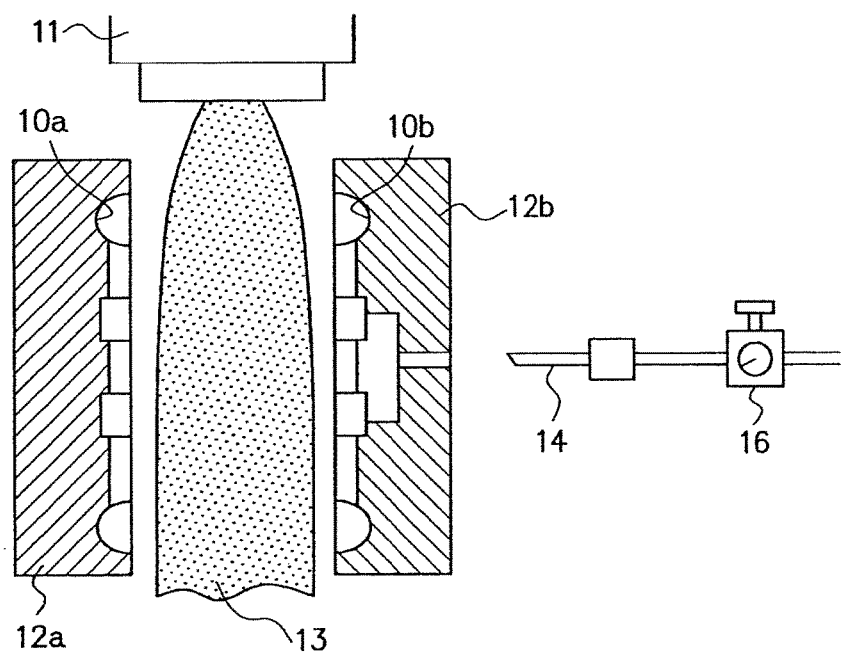
FIG. 4 is a first diagram showing an exemplary molding method for an instrument panel duct 1 of the present embodiment.
Figure 5:
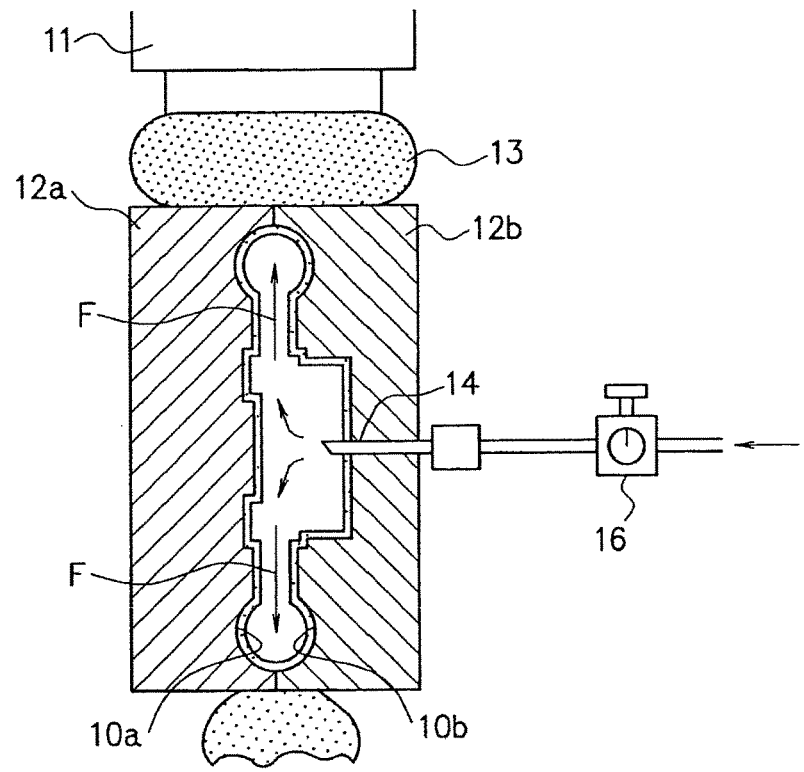
FIG. 5 is a second diagram showing an exemplary molding method for an instrument panel duct 1 of the present embodiment.
Figure 6:
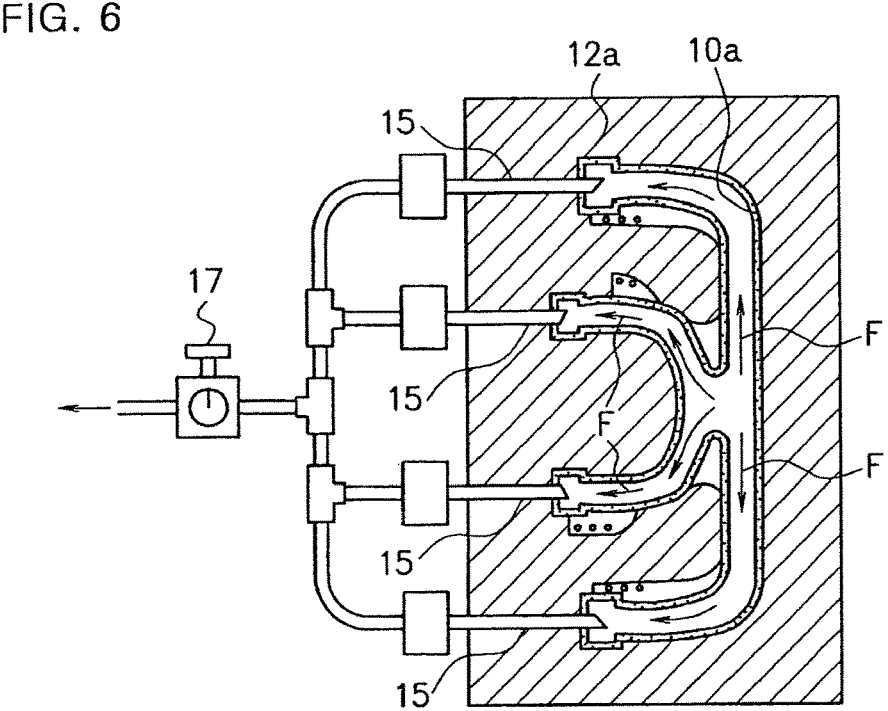
FIG. 6 is a third diagram showing an exemplary molding method for an instrument panel duct 1 of the present embodiment.
Figure 9:
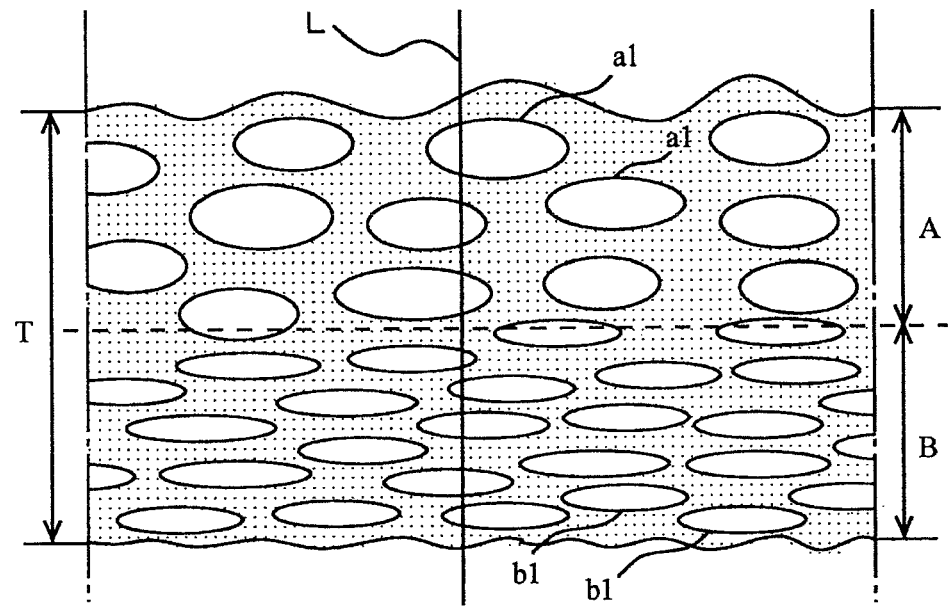
FIG. 9 is a schematic diagram showing a cross section of a tube body X1 of an instrument panel duct 1 of the present embodiment.

First, with reference to FIGS. 1, 9, and 4 to 6, outlines of a foam molded article 1 according to a mode of the present disclosure is described below. FIG. 1 shows an exemplary configuration of an embodiment of the foam molded article 1 according to a mode of the present disclosure. FIG. 9 is a diagram showing the thickness direction T of the foam molded article 1 according to a mode of the present disclosure, which shows the thickness direction T of the vertical cross section of the foam molded article 1 relative to the passage advancement direction of the foam molded article 1 shown in FIG. 1 and in which A indicates the inner surface side of the foam molded article 1 and B indicates the outer surface side. The passage advancement direction indicates a direction perpendicular to the thickness direction and the circumferential direction of the foam molded article 1 and hence indicates the direction A, B (B-1, B-2), or C shown in FIG. 1. FIGS. 4 to 6 are diagrams showing an exemplary molding method for the foam molded article 1 according to a mode of the present disclosure, which shows an example that foamed resin in a molten state is arranged between split metallic molds 12a and 12b and then mold clamping is performed. An example of the foamed resin is a foamed parison 13.

For example, as shown in FIG. 1, the foam molded article 1 according to a mode of the present disclosure is one used for delivering air from an air-conditioner and characterized in that as shown in FIG. 9, in a situation of being divided into two equal parts in the thickness direction T of the foam molded article 1, the average cell diameter α1 in the thickness direction T on the inner surface side A of the foam molded article 1 is 1.2 times ((α1/β1)=1.2) or greater of the average cell diameter β1 in the thickness direction T on the outer surface side B of the foam molded article 1 and that the surface roughness Sm of the inner surface of the foam molded article 1 is 1000 μm or greater. The Sm denotes the average interval of recesses and protrusions and is a value obtained by measurement according to JIS B 0601.

As shown in FIGS. 4 to 6, the foam molded article 1 according to a mode of the present disclosure can be molded by a method that foamed resin 13 in a molten state is arranged between the split metallic molds 12a and 12b and then clamped by the split metallic molds 12a and 12b and, at the same time, the foamed resin 13 is pressed against the split metallic molds 12a and 12b by a pressing force of a fluid F. At that time, the applying time of causing the fluid F to exert a pressing force on the foamed resin 13 is set to be a time within a range that the foamed resin 13 located on the inner surface of the foam molded article 1 is maintained in a molten state. As such, the foam molded article 1 is molded.

In the foam molded article 1 according to a mode of the present disclosure, at the time of molding by the molding method shown in FIGS. 4 to 6 given above, when molding is performed in a manner that the applying time of causing the fluid F to exert a pressing force on the foamed resin 13 is set to be a time within a range that the foamed resin 13 located on the inner surface of the foam molded article 1 is maintained in a molten state, a situation can be suppressed that the resin on the inner surface side A of the foam molded article 1 is solidified so that a film is formed. Further, a situation can be suppressed that many air bubbles having a small air bubble diameter are formed. Further, when molding is performed in a manner that the applying time of causing the fluid F to exert a pressing force on the foamed resin 13 is set to be a time within a range that the foamed resin 13 located on the inner surface of the foam molded article 1 is maintained in a molten state, air bubbles expand large toward the inner surface side of the foam molded article 1 so that undulation is formed in accordance with the shapes of the air bubbles formed in the inner surface of the foam molded article 100. As a result, generation of a balloon-shaped air bubble 81 shown in FIG. 23 can be suppressed and the foam molded article 1 can be molded in which as shown in FIG. 9, in a situation of being divided into two equal parts in the thickness direction T of the foam molded article 1, the average cell diameter α1 in the thickness direction T on the inner surface side A of the foam molded article 1 is 1.2 times or greater of the average cell diameter β1 in the thickness direction T on the outer surface side B of the foam molded article 1 and the surface roughness Sm of the inner surface of the foam molded article 1 is 1000 μm or greater. When the foam molded article 1 according to a mode of the present disclosure is constructed in a cross section shown in FIG. 9, generation of a balloon-shaped air bubble 81 shown in FIG. 23 can be suppressed. Further, since the inner surface side A of the foam molded article 1 is soft, the foam molded article 1 can easily be fit in another member (not shown). Further, since the outer surface side B of the foam molded article 1 is harder than the inner surface side A, the rigidity of the foam molded article 1 can be ensured despite that the inner surface side A of the foam molded article 1 is soft. Embodiments of the foam molded article 1 according to a mode of the present disclosure are described below in detail with reference to the accompanying drawings. Here, the following embodiments are described for an example that the foam molded article 1 is an instrument panel duct 1.

(First Embodiment)

<Exemplary Configuration of Instrument Panel Duct 1>

Figure 2:
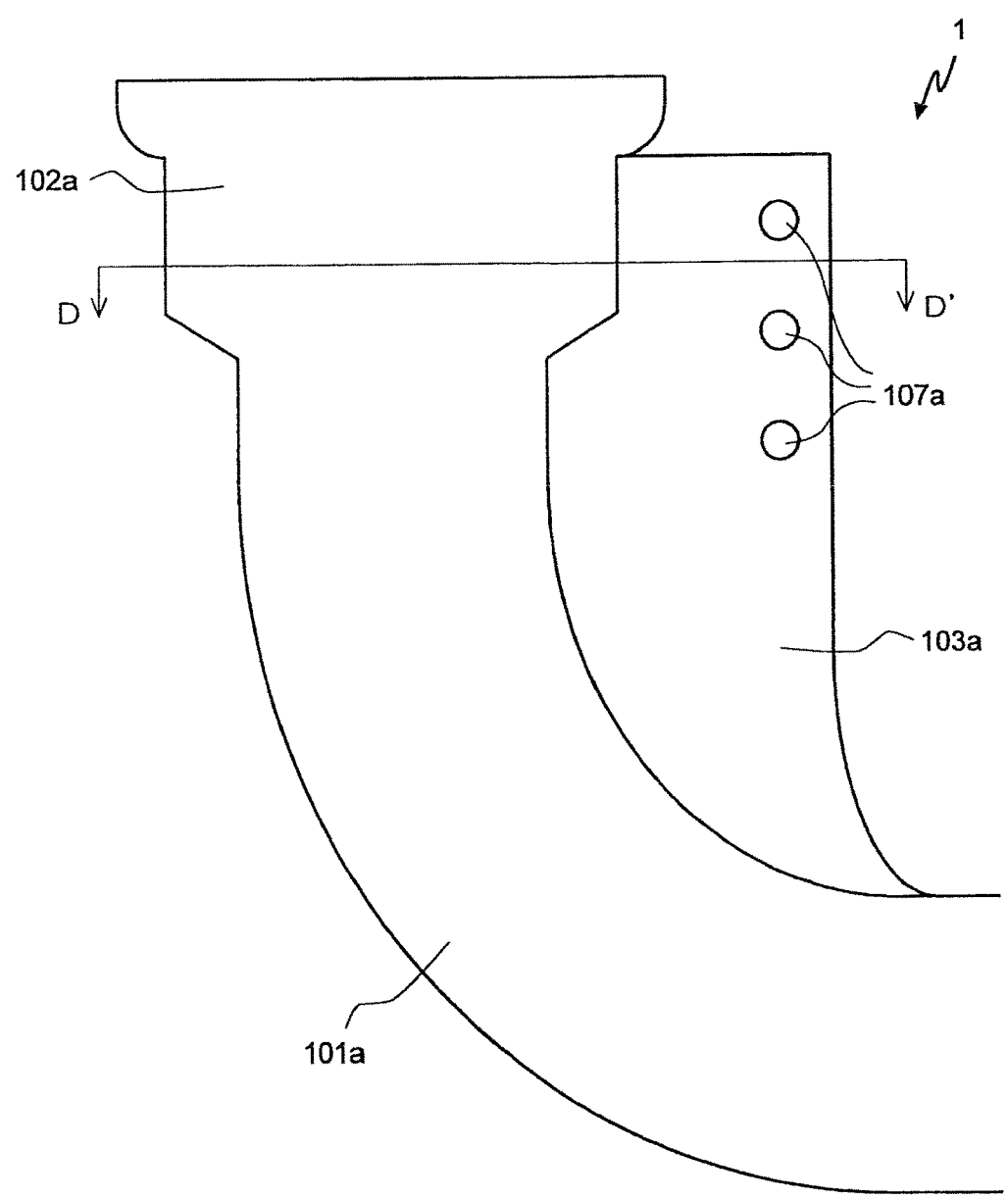
FIG. 2 is a diagram showing a fitting part 102a periphery in an instrument panel duct 1.
Figure 3:
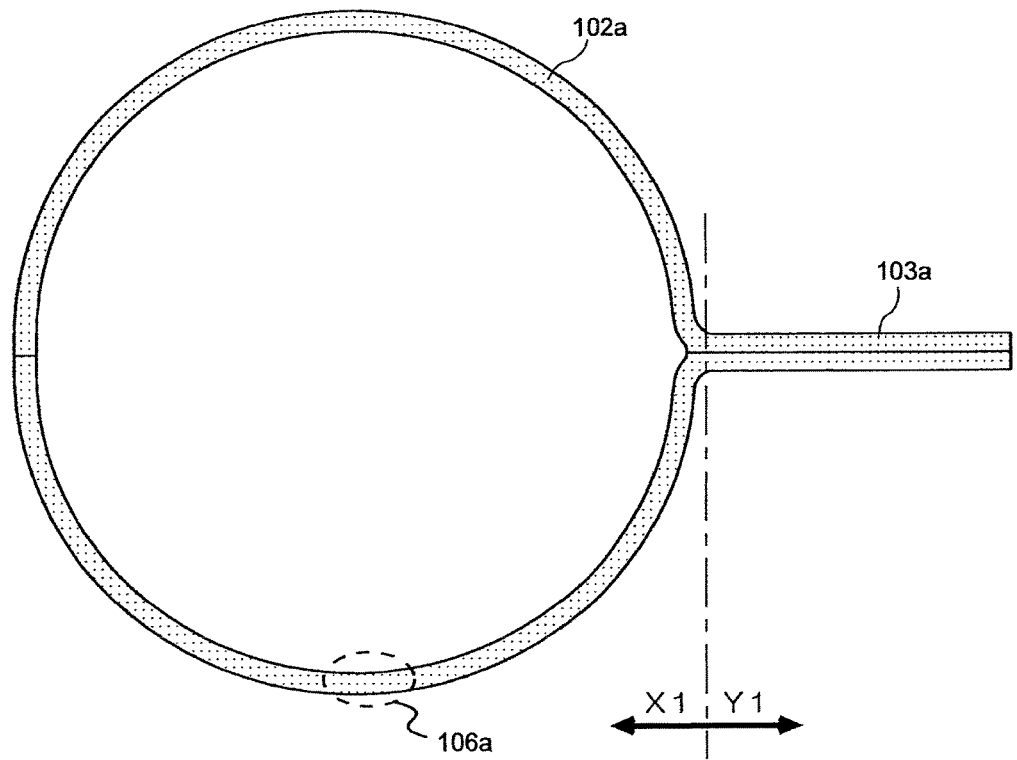
FIG. 3 is a sectional view taken along line D-D' in FIG. 2.

First, with reference to FIGS. 1 to 3, an exemplary configuration of an instrument panel duct 1 of the present embodiment is described below. FIG. 1 is an overall perspective view of the instrument panel duct 1. FIG. 2 is a plan view of a fitting part 102*a* periphery as shown in FIG. 1. FIG. 3 is a sectional view taken along line D-D' in FIG. 2.

The instrument panel duct 1 of the present embodiment is a lightweight instrument panel duct 1 for circulating, to a desired site, heating and cooling air supplied from an air conditioning unit and is molded by a method that thermoplastic resin mixed with a foaming agent is mold-clamped by split metallic molds and then blow molding is performed.

As shown in FIG. 1, in the instrument panel duct 1, a supply port 105 to be connected to an air conditioning unit (not shown) is opened at one end of a tube part 101 and then a fitting part 102 (102*a* to *d*) is provided at the other end of the tube part 101. Further, a flange 103 (103*a* to *d*) is connected to a tube body X1 (see FIG. 3) constructed from the tube part 101, the supply port 105, and the fitting part 102. As such, the instrument panel duct 1 is constructed.

The tube body X1 is constructed in a closed cell structure having a plurality of air bubbles whose foaming magnification falls within a range from 2.0 to 6.0. For example, a closed cell rate of 70% or higher is employed. The average thickness of the tube body X1 is 0.5 to 3.5 mm. Then, construction is performed such that as shown in FIG. 9, when the tube body X1 is divided into two equal parts in the thickness direction T, the average cell diameter $\alpha 1$ of the air bubbles a1 on the inner surface side A in the thickness direction T of the tube body X1 becomes 1.2 to 2.0 times the size of the average cell diameter $\beta 1$ of the air bubbles b1 on the outer surface side B of the tube body X1 (the cell ratio $\alpha 1/\beta 1$ is 1.2 to 2.0).

In the present embodiment, the average thickness indicates the average of thicknesses measured at regular intervals of approximately 100 mm in the hollow extension direction of the resin molding article. In the case of a hollow resin molding article, in each of two wall parts fused with a parting line in between, the thickness at a position in a 90°-direction relative to the parting line is measured and then the average of the measured thicknesses is employed. Here, the measurement points are set not to be located on the above-mentioned flange 103 or the like.

FIG. 9 is a schematic diagram in which a part 106*a* of the tube body X1 shown in FIG. 3 is enlarged, which shows the thickness direction T of the tube body X1. Specifically, this is a diagram in which a part 106*a* of a vertical cross section of the instrument panel duct 1 relative to the passage advancement direction of the instrument panel duct 1 shown in FIG. 1 is enlarged. The vertical cross section indicates a cross section in the circumferential direction shown in FIG. 3. The passage advancement direction indicates a direction perpendicular to the thickness direction and the circumferential direction of the instrument panel duct 1 and hence indicates the direction A, B (B-1, B-2), or C shown in FIG. 1.

In the present embodiment, the average cell diameters $\alpha 1$ and $\beta 1$ indicate values calculated by the following methods.

A part 106*a* of the vertical cross section of the instrument panel duct 1 relative to the passage advancement direction of the instrument panel duct 1 of the present embodiment is expanded and projected and then, on the projection diagram, a straight line L is drawn in parallel to the thickness direction T of the tube body X1 of the instrument panel duct 1.

Then, in the thickness direction T on the inner surface side A of the tube body X1 in a case that the tube body X1 is divided into two equal parts in the thickness direction T, the number of air bubbles a1 intersecting with a straight line L parallel to the thickness direction T is counted and then a value obtained by dividing the actual thickness on the inner surface side A of the tube body X1 by the counted number of air bubbles is adopted as the air bubble diameter $\alpha 1$ in the thickness direction T on the inner surface side A of the tube body X1. For example, in a case that the actual thickness on the inner surface side A of the tube body X1 is T1 µm and the number of air bubbles a1 is three, the air bubble diameter $\alpha 1$ in the thickness direction T on the inner surface side A of the tube body X1 becomes T1/3 µm. This operation is to be performed on a total of four vertical cross sections located at two sites on the right and left vicinities of the supply port 105 located in the center part of the instrument panel duct 1 shown in FIG. 1 and at the both end vicinities. Then, in each vertical cross section, measurement is performed at five positions at regular intervals so that the air bubble diameter $\alpha 1$ is measured at a total of 20 positions. Then, the arithmetic mean value of the air bubble diameters $\alpha 1$ at 18 positions obtained by excluding two points having the greatest and the smallest value from the air bubble diameters a1 at the total of 20 positions is adopted as the average cell diameter $\alpha 1$ of the air bubbles a1 on the inner surface side A in the thickness direction T of the tube body X1. Here, portions where air bubbles are not remarkably deformed (portions not having a large number of crushed air bubbles or remarkably enlarged air bubbles) are adopted as the measured sites. Further, the right and left vicinities of the supply port 105 located in the center part of the instrument panel duct 1 indicate the vicinity of the position on the tube part 101*d* side relative to the supply port 105 shown in FIG. 1 and the vicinity of the position on the tube part 101*a* side relative to the supply port 105. Further, the both end vicinities of the instrument panel duct 1 indicate the vicinities of the fitting parts 102*a* and 102*d* shown in FIG. 1. Here, it is preferable that setup of the measured sites is changed arbitrarily in accordance with the shape of the instrument panel duct 1. In the present embodiment, the instrument panel duct 1 shown in FIG. 1 is molded by mold clamping as shown in FIGS. 5 and 6. Thus, the sites corresponding to the top, middle, and bottom positions of the instrument panel duct 1 at the time of molding shown in FIGS. 5 and 6 are employed as the measured sites. Here, the supply port 105 has been provided in the center part of the instrument panel duct 1 of the present embodiment. Thus, two sites in right and left vicinities of the supply port 105 are employed as the measured sites.

Also for the average cell diameter $\beta 1$, similarly to the average cell diameter $\alpha 1$ calculated above, in the thickness direction T on the outer surface side B of the tube body X1 in a case that the tube body X1 is divided into two equal parts in the thickness direction T, the number of air bubbles b1 intersecting with a straight line L parallel to the thickness direction T is counted and then a value obtained by dividing the actual thickness on the outer surface side B of the tube body X1 by the counted number of air bubbles is adopted as the air bubble diameter $\beta 1$ in the thickness direction T on the outer surface side B of the tube body X1. For example, in a case that the actual thickness on the outer surface side B of the tube body X1 is T2 µm and the number of air bubbles b1 is five, the air bubble diameter $\beta 1$ in the thickness direction T on the outer surface side B of the tube body X1 becomes T2/5 µm. This operation is to be performed on a total of four vertical cross sections located at two sites on the right and left vicinities of the supply port 105 located in the center part of the instrument panel duct 1 shown in FIG. 1 and at the both end vicinities. Then, in each vertical cross section, measurement is performed at five positions at regular intervals so that the air bubble diameter $\beta 1$ is measured at a total of 20 positions. Then, the arithmetic mean value of the air bubble diameters β1 at 18 positions obtained by excluding two points having the greatest and the smallest value from the air bubble diameters β1 at the total of 20 positions is adopted as the average cell diameter β1 of the air bubbles b1 on the outer surface side B in the thickness direction T of the tube body X1. Here, portions where air bubbles are not remarkably deformed (portions not having a large number of crushed air bubbles or remarkably enlarged air bubbles) are adopted as the measured sites.

In the instrument panel duct 1 of the present embodiment, under the premise that the average cell diameters α1 and β1 of the air bubbles a1 and b1 in the thickness direction T of the tube body X1 satisfy the above-mentioned condition for the bubble ratio, it is preferable that construction is performed such that at least the average cell diameter β1 of the air bubbles b1 is smaller than 100 μm. When construction is performed such that the average cell diameter β1 of the air bubbles b1 is smaller than 100 μm, the rigidity of the outer surface side B of the tube body X1 can be improved.

Further, in the instrument panel duct 1 of the present embodiment under the premise that the average cell diameters α1 and β1 of the air bubbles a1 and b1 in the thickness direction T of the tube body X1 satisfy the above-mentioned condition for the bubble ratio, it is more preferable that construction is performed such that the average cell diameter β1 of the air bubbles b1 falls within a range from 70 to 95 μm and the average cell diameter α1 of the air bubbles a1 falls within a range from 100 μm to 125 μm. By virtue of this, generation of a balloon-shaped air bubble 81 shown in FIG. 23 can be suppressed. Further, the inner surface side A of the instrument panel duct 1 becomes soft and hence the instrument panel duct 1 can easily be fit in another member (not shown). Further, the rigidity of the outer surface side B of the instrument panel duct 1 can be improved.

Here, the air bubbles a1 and b1 in FIG. 9 have been shown in the case of elliptic shapes flatten in a direction perpendicular to the thickness direction T of the tube body X1. However, the shapes of the air bubbles a1 and b1 of the present embodiment are not limited to elliptic and may be arbitrary.

The inner side of the tube body X1 of the instrument panel duct 1 of the present embodiment is constructed such as to include a passage through which a fluid is circulated. Then, heating and cooling air from an air conditioning unit is circulated there.

As shown in FIG. 1, the passage for the fluid supplied through the supply port 105 is divided into four consisting of passages A, B-1, B-2, and C. The instrument panel duct 1 is constructed such that the fluid supplied through the supply port 105 flows out respectively through the opening part of the fitting part 102a in the passage A, through the opening part of the fitting part 102b in the passage B-1, through the opening part of the fitting part 102c in the passage B-2, and through the opening part of the fitting part 102d in the passage C.

The configuration of the surroundings of the passage A in the instrument panel duct 1 is constructed such that the supply port 105 is opened at one end of the tube part 101a, then the fitting part 102a is provided at the other end, and then the flange 103a is connected to the tube body X1 constructed from the tube part 101a, the supply port 105, and the fitting part 102a. In the flange 103a, fixing holes 107a are opened that are used for fixing to another tubular member connected through the fitting part 102a. When bolts (not shown) are inserted through the fixing holes 107a and then tightened with nuts, the instrument panel duct 1 can be fixed to another tubular member.

The configuration of the surroundings of the passage B-1 in the instrument panel duct 1 is constructed such that the supply port 105 is opened at one end of the tube part 101b, then the fitting part 102b is provided at the other end, and then the flange 103b is connected to the tube body X1 constructed from the tube part 101b, the supply port 105, and the fitting part 102b. In the flange 103b, fixing holes 107b are opened that are used for fixing to another tubular member connected through the fitting part 102b. When bolts (not shown) are inserted through the fixing holes 107b and then tightened with nuts, the instrument panel duct 1 can be fixed to another tubular member.

Further, in a portion where the interval between the tube parts 101a and 101b is narrow, a bridging part 104e for maintaining the strength is provided and connected respectively to these tube parts 101a and 101b.

The configuration of the surroundings of the passage B-2 in the instrument panel duct 1 is constructed similarly to the configuration of the surroundings of the passage B-1 described above.

The configuration of the surroundings of the passage C in the instrument panel duct 1 is constructed similarly to the configuration of the surroundings of the passage A described above.

The instrument panel duct 1 of the present embodiment is constructed from a polypropylene-based resin and preferably constructed from a blended resin mixed with 1 to 20 wt % of polyethylene-based resin and/or 5 to 40 wt % of hydrogenated styrene-based thermoplastic elastomer. Then, it is preferable that the tensile fracture elongation at −10° C. is 40% or greater and the modulus of elasticity in tension at an ordinary temperature is 1000 kg/cm$^2$ or higher. Further, it is preferable that the tensile fracture elongation at −10° C. is 100% or greater. Here, terms used in the present embodiment are defined below.

Foaming magnification: A value obtained by dividing the density of thermoplastic resin used in the later-described molding method of the present embodiment by the apparent density in the tube body X1 of the instrument panel duct 1 obtained by the molding method of the present embodiment was adopted as the foaming magnification.

Tensile fracture elongation: The tube body X1 of the instrument panel duct 1 obtained by the later-described molding method of the present embodiment was cut out and stored at −10° C., and then adopted as a type-2 test piece according to JIS K-7113. Then, measurement was performed with a tension rate of 50 mm/min and then the obtained value was adopted as the tensile fracture elongation.

Modulus of elasticity in tension: The tube body X1 of the instrument panel duct 1 obtained by the later-described molding method of the present embodiment was cut out and then adopted as a type-2 test piece according to JIS K-7113. Then, measurement was performed at a room temperature (indicating 23° C.) with a tension rate of 50 mm/min and then the obtained value was adopted as the modulus of elasticity in tension.

<Exemplary Molding Method for Instrument Panel Duct 1>

Next, with reference to FIGS. 4 to 6, an exemplary molding method for the instrument panel duct 1 of the present embodiment is described below. FIG. 4 shows an opened state of the split metallic molds. FIG. 5 shows a closed state of the split metallic molds in side view. FIG. 6 is a sectional view of a closed state, in which the split metallic mold 12a side is viewed from the contact surface of the two split metallic molds.

First, as shown in FIG. 4, foamed parison is ejected through an annular dice 11 so that a foamed parison 13 of cylindrical shape is extruded between the split metallic molds 12a and 12b.

Then, the split metallic molds 12a and 12b are mold-clamped so that as shown in FIG. 5, the foamed parison 13 is clamped by the split metallic molds 12a and 12b. As a result, the foamed parison 13 is accommodated in the cavities 10a and 10b of the split metallic molds 12a and 12b.

Then, as shown in FIGS. 5 and 6, in a state that the split metallic molds 12a and 12b are mold-clamped, a blow-in needle 14 and blow-out needles 15 are inserted through predetermined holes provided in the split metallic molds 12a and 12b, and then inserted into the foamed parison 13 simultaneously. Once the tips of the blow-in needle 14 and the blow-out needles 15 enter the foamed parison 13, compressed gas such as air is immediately blown in through the blow-in needle 14 to the inside of the foamed parison 13 and then the compressed gas is blown out from the inside of the foamed parison 13 through the blow-out needles 15 so that blow molding is performed at a predetermined blow pressure.

The blow-in needle 14 is inserted at a position corresponding to the opening part of the supply port 105 of the instrument panel duct 1 shown in FIG. 1 so that a blow-in port used for blowing in the compressed gas to the inside of the foamed parison 13 is formed. Further, the blow-out needles 15 are inserted at positions corresponding to the opening parts of the individual fitting parts 102 (102a to 102d) of the instrument panel duct 1 shown in FIG. 1 so that blow-out ports used for blowing out the compressed gas from the inside of the foamed parison 13 to the outside are formed.

By virtue of this, the compressed gas is blown in through the blow-in needle 14 to the inside of the foamed parison 13 and the compressed gas is blown out from the inside of the foamed parison 13 through the blow-out needles 15 so that blow molding can be achieved at a predetermined blow pressure.

As described above, the blow-in needle 14 is inserted through the opening part of the supply port 105 of the instrument panel duct 1. Thus, as shown in FIG. 5, the blow-in needle 14 is inserted into the split metallic mold 12b from the side of the split metallic mold 12b opposite to the split metallic mold 12a.

Further, as described above, the blow-out needles 15 are inserted through the opening parts of the individual fitting parts 102 (102a to 102d) of the instrument panel duct 1. Thus, as shown in FIG. 6, the blow-out needles 15 are inserted into the split metallic molds 12a and 12b along the contact surface between the split metallic molds 12a and 12b.

It is preferable that a bamboo spear needle shown in FIG. 7(a) is employed as the blow-in needle 14. Such a bamboo spear needle has an advantage that the direction of insertion of the needle is identical to the direction of blow-in/blow-out and hence fabrication is easy. Nevertheless, when the bamboo spear needle is used as a blow-out needle, a possibility arises that resin enters through the needle tip hole so that blow-out of air becomes impossible.

Thus, it is preferable that a rocket needle shown in FIG. 7(b) is employed as the blow-out needles 15. The rocket needle is constructed such that the direction of blow-in/blow-out is in a direction intersecting with the direction of insertion of the needle.

The blow pressure is a differential pressure between a regulator 16 and a back pressure regulator 17. Then, in a state that the split metallic molds 12a and 12b are sealed together, the regulator 16 and the back pressure regulator 17 are respectively set to be predetermined pressures so that blow molding is performed at a predetermined blow pressure. For example, compressed gas at a predetermined pressure is blown in through the blow-in needle 14 into the foamed parison 13 for a predetermined time so that the pressure in the inside of the foamed parison 13 is pressurized from the atmospheric pressure into a predetermined pressured state.

The blow pressure is set to be 0.5 to 3.0 kg/cm$^2$ and, preferably, set to be 0.5 to 1.0 kg/cm$^2$. When the blow pressure is set to be 3.0 kg/cm$^2$ or higher, the thickness of the tube body X1 of the instrument panel duct 1 is easily crushed or, alternatively, the foaming magnification easily decreases. Further, when the blow pressure is set to be 0.5 kg/cm$^2$ or lower, adjustment of the differential pressure between the regulator 16 and the back pressure regulator 17 becomes difficult or, alternatively, the surface shape of the air flow path in the instrument panel duct 1 becomes difficult to be deformed along the passage direction F of the compressed gas blown in to the inside of the foamed parison 13. Thus, the blow pressure is set to be 0.5 to 3.0 kg/cm$^2$ and, preferably, set to be 0.5 to 1.0 kg/cm$^2$.

Further, when blow molding is performed at a predetermined blow pressure, a temperature control facility may be provided so that the compressed gas supplied through the blow-in needle 14 into the foamed parison 13 may be heated to a predetermined temperature. By virtue of this, the compressed gas supplied into the foamed parison 13 becomes the predetermined temperature. This causes easy foaming in the foaming agent contained in the foamed parison 13. Here, it is preferable that the predetermined temperature is set to be a temperature suitable for causing foaming in the foaming agent.

Further, in place of providing the temperature control facility, the compressed gas supplied through the blow-in needle 14 into the foamed parison 13 may be at a room temperature. This avoids the necessity of providing the temperature control facility for adjusting the temperature of the compressed gas. Thus, the instrument panel duct 1 can be molded at a low cost. Further, in a case that heating to a predetermined temperature is performed at the time of blow molding, the instrument panel duct 1 posterior to blow molding need be cooled. Thus, blow molding performed at a room temperature can contribute to shortening of the cooling time for the instrument panel duct 1 posterior to blow molding.

It is preferable that the temperature of the split metallic molds 12a and 12b at the time of blow molding is set to be a temperature such as approximately 25° C. not causing dew condensation.

In the present embodiment, compressed gas is blown in through the blow-in needle 14 into the foamed parison 13 and, at the same time, air is evacuated from the cavities 10a and 10b of the split metallic molds 12a and 12b so that a gap between the foamed parison 13 and the cavities 10a and 10b is excluded and a negative pressure state is generated. By virtue of this, a pressure difference is set up between the inside and the outside of the foamed parison 13 accommodated in the cavities 10a and 10b of the inside of the split metallic molds 12a and 12b so that the foamed parison 13 is pressed against the wall surface of the cavities 10a and 10b. The pressure difference is set to be a pressure such that the inside of the foamed parison 13 has a higher pressure than the outside.

Here, in the molding process described above, the process of blowing in the compressed gas to the inside of the foamed parison 13 and the process of generating a negative pressure in the outside of the foamed parison 13 need not be simultaneously performed. That is, these processes may be performed at different timings from each other.

Figure 8:
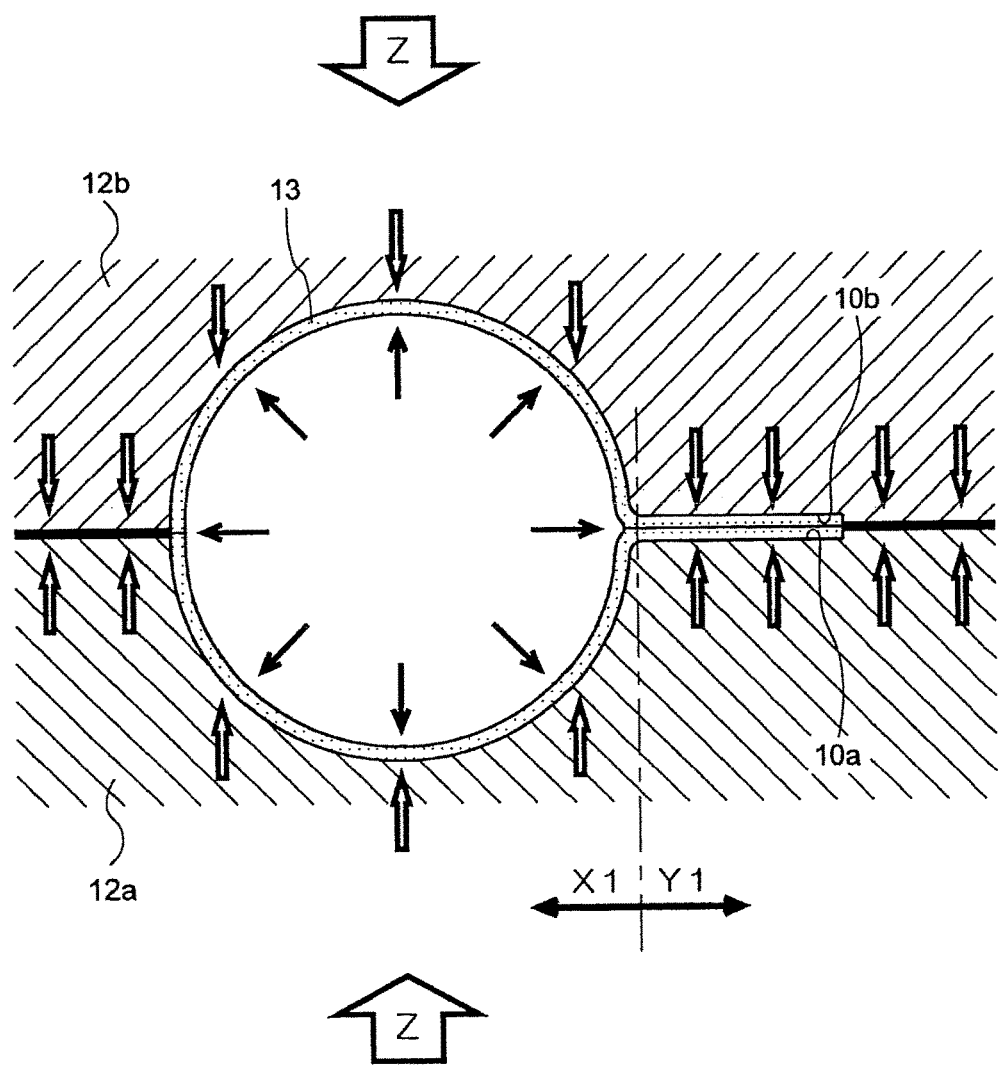
FIG. 8 is a diagram showing a fitting part 102a periphery at the time of mold clamping by split metallic molds.

In the present embodiment, as shown in FIG. 8, the foamed parison 13 is mold-clamped with a pressing force Z by the split metallic molds 12a and 12b. Thus, as described above, the portion expected to constitute the tube body X1 in the foamed parison 13 is pressed against the cavities 10a and 10b by a predetermined blow pressure and, at the same time, the portion expected to constitute the plate-shaped part Y1 of the flange 103 (103a to 103d) or the bridging part 104 (104e, 104f) is pressed in the thickness direction so as to be compressed into the thickness between the cavities 10a and 10b of the split metallic molds 12a and 12b.

In the portion expected to constitute the tube body X1 in the foamed parison 13, as described above, compressed gas such as air is blown in through the blow-in needle 14 to the inside of the foamed parison 13 and then the compressed gas is blown out from the inside of the foamed parison 13 through the blow-out needles 15 so that the foamed parison 13 is pressed against the cavities 10a and 10b for a predetermined time by a predetermined blow pressure and then cooling solidification is performed on approximately 50 to 80 percent of the foamed parison 13 measured from the cavity 10a or 10b side in the thickness direction of the tube body X1. After that, cooling by compressed gas is not performed and hence the remaining foamed parison 13 in a molten state is naturally solidified in a state of mold clamping by the split metallic molds 12a and 12b.

The temperature of the compressed gas supplied through the blow-in needle 14 into the foamed parison 13 for cooling is set to be 10° C. to 30° C. and, preferably, set to be a room temperature (e.g., 23° C.). When the temperature of the compressed gas is set to be a room temperature, this avoids the necessity of providing a temperature control facility for adjusting the temperature of the compressed gas. Thus, the instrument panel duct 1 can be molded at a low cost. Further, when a temperature control facility is provided so that the temperature of the compressed gas supplied through the blow-in needle 14 into the foamed parison 13 is set to be lower than a room temperature, the cooling time for the instrument panel duct 1 can be reduced. Here, although depending on the temperature of the compressed gas, it is preferable that cooling by compressed gas is performed for a cooling time (indicating the applying time) of 35 seconds or shorter. By virtue of this, regardless of the material of the foamed parison 13 constituting the instrument panel duct 1, cooling solidification is performed on approximately 50 to 80 percent of the foamed parison 13 measured from the cavity 10a or 10b side in the thickness direction of the tube body X1 and the foamed parison 13 on the inner surface side of the tube body X1 can be maintained intact in a molten state. After that, cooling by compressed gas is not performed and hence the remaining foamed parison 13 in a molten state can naturally be solidified in a state of mold clamping by the split metallic molds 12a and 12b.

In the molding method of the present embodiment, cooling by compressed gas is performed in a short time (e.g., 35 seconds) so that cooling solidification is performed on approximately 50 to 80 percent of the foamed parison 13 measured from the cavity 10a or 10b side in the thickness direction of the tube body X1 and the foamed parison 13 on the inner surface side of the tube body X1 is maintained intact in a molten state. After that, cooling by compressed gas is not performed and hence the remaining foamed parison 13 in a molten state is naturally solidified in a state of mold clamping by the split metallic molds 12a and 12b.

By virtue of this, growth of air bubbles in the foamed parison 13 on the outer surface side of the tube body X1 can be suppressed and growth of air bubbles in the foamed parison 13 on the inner surface side of the tube body X1 can be accelerated.

As a result, as shown in FIG. 9, when the tube body X1 posterior to molding is divided into two equal parts in the thickness direction T, the average cell diameter $\alpha 1$ of the air bubbles a1 on the inner surface side A in the thickness direction T of the tube body X1 becomes 1.2 to 2.0 times the size of the average cell diameter $\beta 1$ of the air bubbles b1 on the outer surface side B of the tube body X1 (the cell ratio $\alpha 1/\beta 1$ is 1.2 to 2.0). That is, a portion where the air bubbles b1 having a small air bubble diameter $\beta 1$ are collected is not formed on the inner surface side A of the tube body X1 and a portion where the air bubbles a1 having a large air bubble diameter $\alpha 1$ are collected is formed on the inner surface side A of the tube body X1.

Figure 10:
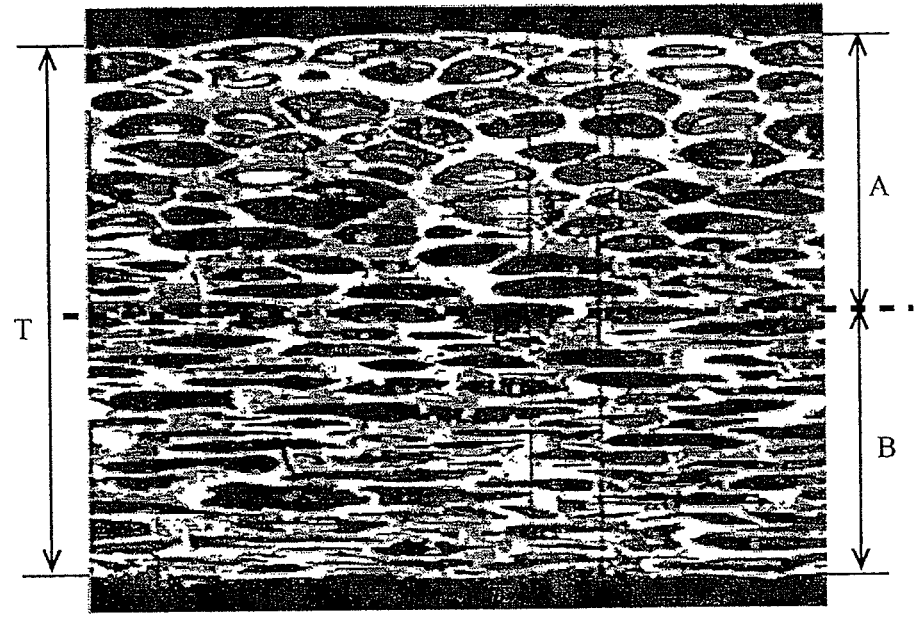
FIG. 10 is a photograph of a cross section of a tube body X1 acquired with a CCD camera.

Further, a portion where bubbles a1 are connected to each other is formed in a greater thickness than a portion where bubbles b1 are connected to each other. Thus, the thickness on the inner surface side A of the tube body X1 can be formed thicker than the outer surface side B of the tube body X1. FIG. 9 is a schematic diagram in which a part 106a of the tube body X1 shown in FIG. 3 is enlarged. FIG. 10 is a photograph of a part 106a of the tube body X1 shown in FIG. 3 acquired by a CCD camera.

Figure 23:
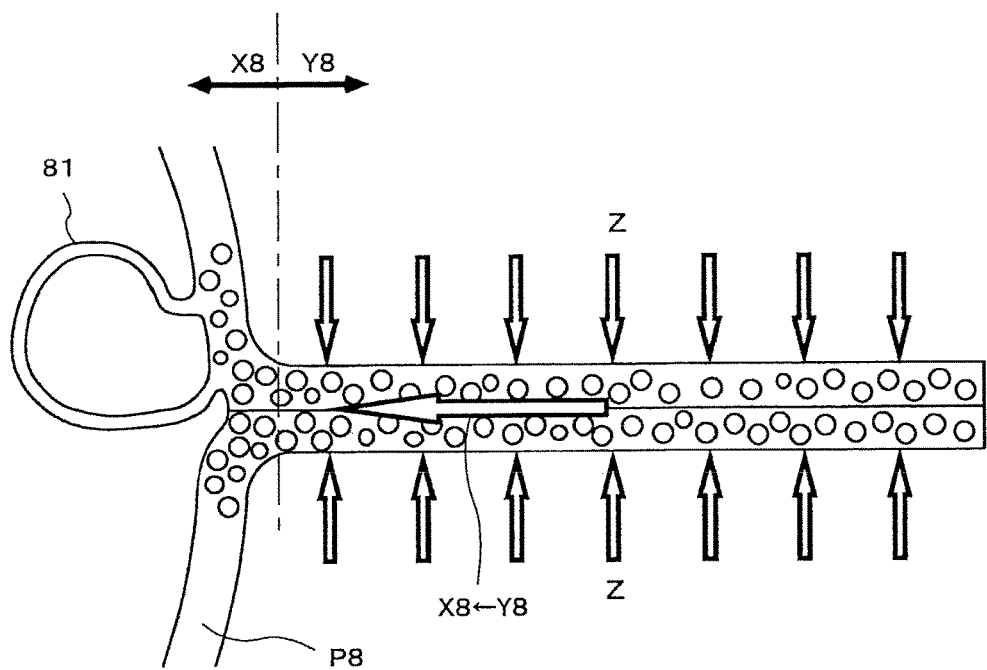
FIG. 23 is a diagram showing a situation that a balloon-shaped air bubble 81 is generated in a tube body X8.

Further, in the molding method of the present embodiment, cooling by compressed gas is performed in a short time so that the foamed parison 13 on the inner surface side of the tube body X1 is maintained intact in a molten state and hence a film is not formed on the inner surface side of the tube body X1. Thus, when air bubbles grow large on the inner surface side A of the tube body X1 side at the time of natural solidification, the bubbles break and hence a situation can be avoided that a balloon-shaped air bubble 81 shown in FIG. 23 is generated. Further, when cooling by compressed gas is performed in a short time, air bubbles expand large toward the inner surface side of the tube body X1 so that undulation is formed in accordance with the shapes of the air bubbles formed in the inner surface of the tube body X1. As a result, the surface roughness Sm of the inner surface side A of the tube body X1 posterior to molding can be made 1000 μm or greater. Further, the surface roughness Sm of the outer surface side B of the tube body X1 posterior to molding becomes smaller than 1000 μm. The Sm denotes the average interval of recesses and protrusions in the surface and is a value obtained by measurement according to JIS B 0601.

In contrast, in the molding method of the conventional art, cooling by compressed gas is performed in a long time (e.g., 55 seconds) so that cooling solidification is performed on the entirety of the foamed parison 13 in the thickness direction of the tube body X1. Thus, the cooling by compressed gas in a long-time accelerates growth of air bubbles in the foamed parison 13 on the outer surface side of the tube body X1 and suppresses growth of air bubbles in the foamed parison 13 on the inner surface side of the tube body X1.

Figure 11:
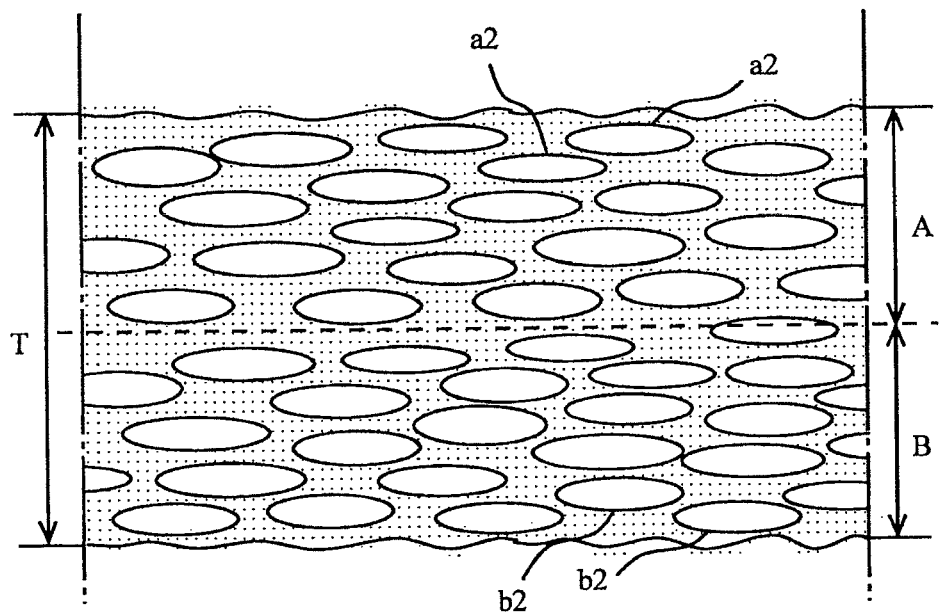
FIG. 11 is a schematic diagram showing a cross section of a tube body X1 of another instrument panel duct used for comparison with an instrument panel duct 1 of the present embodiment.

As a result, as shown in FIG. 11, the average cell diameter $\alpha 1$ on the inner surface side A in the thickness direction T of the tube body X1 posterior to molding becomes approximately equal to the average cell diameter $\beta 1$ on the outer surface side B of the tube body X1 (indicating that the bubble ratio $\alpha 1/\beta 1$ is smaller than 1.2). Thus, portions where air bubbles a2 and b2 having almost the same air bubble diameters α1 and β1 are collected are formed in the entirety of the thickness direction T of the tube body X1.

Figure 12:
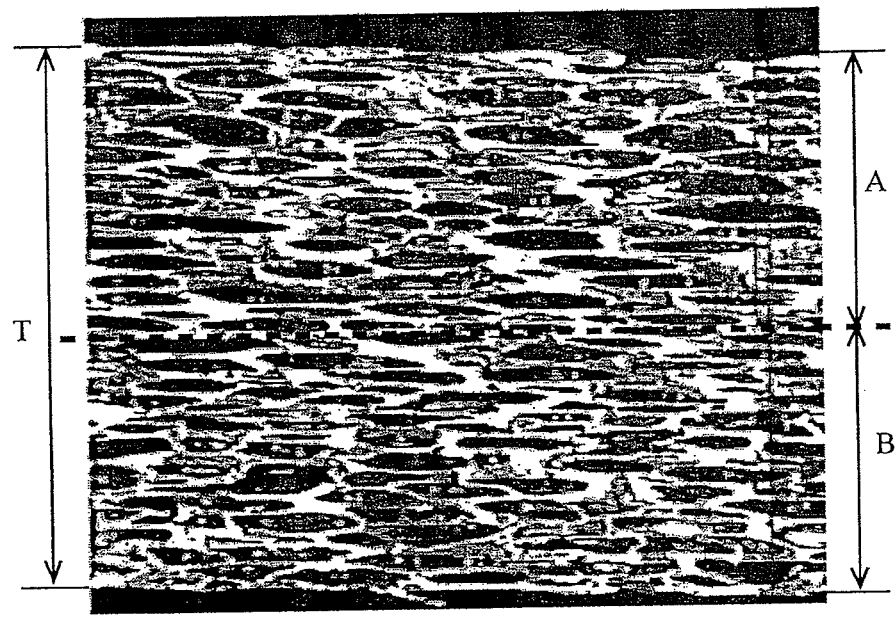
FIG. 12 is a photograph of a cross section of a tube body X1 acquired with a CCD camera.

Further, in portions where air bubbles a2, a2, b2, and b2 are connected to each other, the thickness becomes thin and hence the thickness on the inner surface side A of the tube body X1 also becomes thin. FIG. 11 is a schematic diagram in which a part of the tube body X1 of another instrument panel duct used for comparison with the instrument panel duct 1 of the present embodiment is enlarged. FIG. 12 is a photograph of a part of the tube body X1 of another instrument panel duct acquired by a CCD camera.

Further, since a film is formed on the inner surface side A of the tube body X1 side, a balloon-shaped air bubble 81 shown in FIG. 23 is generated. Further, when cooling by compressed gas is performed in a long time, air bubbles do not expand large toward the inner surface side of the tube body X1 and hence undulation is formed in accordance with the shapes of the air bubbles formed in the inner surface of the tube body X1 and the shapes of the air bubbles formed somewhat on the inner surface side relative to the inner surface of the tube body X1. As a result, the surface roughness Sm of the inner surface side A of the tube body X1 posterior to molding becomes smaller than 1000 μm. Further, the surface roughness Sm of the outer surface side B of the tube body X1 posterior to molding becomes smaller than 1000 μm.

Thus, like in the molding method of the present embodiment, it is preferable that: cooling by compressed gas is performed in a short time (e.g., 35 seconds) so that cooling solidification is performed on approximately 50 to 80 percent of the foamed parison 13 measured from the cavity 10a or 10b side in the thickness direction of the tube body X1 and the foamed parison 13 on the inner surface side of the tube body X1 is maintained intact in a molten state; and, after that, cooling by compressed gas is not performed and hence the remaining foamed parison 13 in a molten state is naturally solidified in a state of mold clamping by the split metallic molds 12a and 12b. By virtue of this, the instrument panel duct 1 in which a balloon-shaped air bubble 81 shown in FIG. 23 is not generated can be obtained.

As a polypropylene-based resin employable at the time of molding of the instrument panel duct 1 of the present embodiment, a polypropylene whose melt tension at 230° C. falls within a range from 30 to 350 mN is preferable. In particular, it is preferable that the polypropylene-based resin is a propylene homopolymer having a long-chain branching structure. Further, it is more preferable that an ethylene-propylene block copolymer is added.

Further, as for the hydrogenated styrene-based thermoplastic elastomer to be blended to the polypropylene-based resin, in order to improve the shock resistance and maintain the rigidity as the instrument panel duct 1, it is preferable that 5 to 40 wt % relative to the polypropylene-based resin is added and, preferably, added within a range from 15 to 30 wt %.

Specifically, a hydrogenated polymer such as a styrene-butadiene-styrene block copolymer, a styrene-isoprene-styrene block copolymer, and a styrene-butadiene random copolymer is employed. Further, as for the hydrogenated styrene-based thermoplastic elastomer, the styrene content is lower than 30 wt % and, preferably, lower than 20 wt %. Further, the MFR at 230° C. (the MFR is measured at a test temperature of 230° C. with a test load of 2.16 kg according to JIS K-7210) is 10 g/10 minutes or smaller and, preferably, 5.0 g/10 minutes or smaller and 1.0 g/10 minutes or greater.

Further, as a polyolefine-based polymer to be blended to the polypropylene-based resin, ethylene-α-olefin of low density is preferable and it is preferable to be mixed within a range from 1 to 20 wt %. It is preferable that the employed ethylene-α-olefin of low density is one having a density of 0.91 g/cm3 or lower, and hence an ethylene-α-olefine copolymer obtained by copolymerization between ethylene and α-olefin having 3 to 20 carbon atoms is preferable. Further, there are propylene, 1-butene, 1-pentene, 1-hexene, 1-heptene, 1-octene, 1-nonene, 1-decene, 1-dodecen, 4-methyl-1-pentene, 4-methyl-1-hexene, and the like and, in particular, 1-butene, 1-hexene, 1-octene, and the like are preferable. Further, the above-mentioned α-olefin having 3 to 20 carbon atoms may be employed independently or, alternatively, two or more kinds may be employed together. It is preferable that the content of monomer units based on ethylene in the ethylene-α-olefine copolymer falls within a range from 50 to 99 wt % relative to ethylene-α-olefine copolymer. Further, it is preferable that the content of monomer units based on α-olefin falls within a range from 1 to 50 wt % relative to ethylene-α-olefine copolymer. In particular, it is preferable that straight-chain ultra-low density polyethylene obtained by polymerization using a metallocene-based catalyst is employed or, alternatively, an ethylene-based elastomer or a propylene-based elastomer is employed.

Further, foaming agents applicable at the time of molding of the instrument panel duct 1 of the present embodiment include a physical foaming agent, a chemical foaming agent, and a mixture thereof. Applicable physical foaming agents include: an inorganic physical foaming agent such as air, carbon dioxide gas, nitrogen gas, and water: an organic physical foaming agent such as butane, pentane, hexane, dichloromethane, and dichloroethane; and a supercritical fluid thereof. It is preferable that the supercritical fluid is prepared by using carbon dioxide, nitrogen, or the like. Then, in the case of nitrogen, the supercritical fluid can be prepared at a critical temperature of −149.1° C. and a critical pressure 3.4 MPa or higher. In the case of carbon dioxide, the supercritical fluid can be prepared at a critical temperature of 31° C. and a critical pressure of 7.4 MPa or higher.

IMPLEMENTATION EXAMPLES

Next, a detailed implementation example to which the embodiment given above has been applied is described below with reference to FIGS. 4 to 6, 9, and 10. Here, the implementation examples given below are exemplary and the present invention is not limited to the following implementation examples.

Implementation Example 1

In implementation example 1, 20 instrument panel ducts 1 were molded in which: the thickness of the foamed parison 13 shown in FIG. 4 was set to be 3.0 mm; the blow pressure by compressed gas was set to be 1.0 kg/cm$^2$ and the cooling time (indicating the applying time) was set to be 15 seconds in the molding method of the present embodiment shown in FIGS. 4 to 6 described above; and the foaming magnification of the tube body X1 of the instrument panel duct 1 posterior to molding was 2.8 times and the average thickness was 2.5 mm.

As shown in FIG. 9, in a situation of being divided into two equal parts in the thickness direction T of the tube body X1 of the molded instrument panel duct 1, the cell ratio (α1/β1) between the average cell diameter α1 in the thickness direction T on the inner surface side A of the tube body X1 and the average cell diameter β1 in the thickness direction T on the outer surface side B of the tube body X1 was 1.55 in the case of implementation example 1.

As for the average cell diameters α1 and β1, the tube body X1 of the instrument panel duct 1 was sectioned with a microtome (RM2145 fabricated by LEICA), then an image of the obtained vertical cross section was acquired with a CCD camera (KEYENCE VH-6300) so that an image like the photograph shown in FIG. 10 was acquired, and then on the basis of the acquired image of the tube body X1 shown in FIG. 10, measurement and calculation were performed by the same measuring method as the measuring method for the average cell diameters α1 and β1 described in the above-mentioned embodiment.

In the case of implementation example 1, the average cell diameter α1 was 96.1 μm and the average cell diameter β1 was 62.2 μm. Thus, the bubble ratio (α1/β1) in implementation example 1 was 96.1 μm/62.2 μm≈1.55.

Further, the surface roughness Sm of the inner surface of the tube body X1 of the molded instrument panel duct 1 was 1227 μm.

The surface roughness Sm of the inner surface of the tube body X1 is a value obtained by measurement according to JIS B 0601 using a surface roughness measuring instrument (SURFCOM 470A fabricated by TOKYO SEIMITSU CO., LTD.).

Further, in the instrument panel duct 1 of implementation example 1, in all 20 samples, a balloon-shaped air bubble was not generated on the inner side of the tube body X1 (a balloon phenomenon was absent: ○).

Implementation Example 2

In implementation example 2, in the molding method of implementation example 1 given above, the cooling time was set to be 25 seconds so that the instrument panel duct 1 was molded in which the foaming magnification of the tube body X1 of the instrument panel duct 1 posterior to molding was 2.8 times.

The cell ratio (α1/β1) in implementation example 2 was 89.3 μm/63.8 μm≈1.40.

Further, the surface roughness Sm was 1187 μm.

Further, in the instrument panel duct 1 of implementation example 2, in all 20 samples, a balloon-shaped air bubble was not generated on the inner side of the tube body X1 (a balloon phenomenon was absent: ○).

Implementation Example 3

In implementation example 3, in the molding method of implementation example 1 given above, the cooling time was set to be 35 seconds so that the instrument panel duct 1 was molded in which the foaming magnification of the tube body X1 of the instrument panel duct 1 posterior to molding was 2.8 times.

The cell ratio (α1/β1) in implementation example 3 was 81.1 μm/64.9 μm≈1.25.

Further, the surface roughness Sm was 1068 μm.

Further, in the instrument panel duct 1 of implementation example 3, in all 20 samples, a balloon-shaped air bubble was not generated on the inner side of the tube body X1 (a balloon phenomenon was absent: ○).

Implementation Example 4

In implementation example 4, in the molding method of implementation example 1 given above, the cooling time was set to be 35 seconds and the molding conditions were adjusted suitably so that the instrument panel duct 1 was molded in which the foaming magnification of the tube body X1 of the instrument panel duct 1 posterior to molding was 2.0 times.

The cell ratio (α1/β1) in implementation example 4 was 80.7 μm/61.6 μm≈1.31.

Further, the surface roughness Sm was 1049 μm.

Further, in the instrument panel duct 1 of implementation example 4, in all 20 samples, a balloon-shaped air bubble was not generated on the inner side of the tube body X1 (a balloon phenomenon was absent: ○).

Implementation Example 5

In implementation example 5, in the molding method of implementation example 4 given above, the cooling time was set to be 45 seconds so that the instrument panel duct 1 was molded in which the foaming magnification of the tube body X1 of the instrument panel duct 1 posterior to molding was 2.0 times.

The cell ratio (α1/β1) in implementation example 5 was 76.5 μm/61.2 μm≈1.25.

Further, the surface roughness Sm was 1024 μm.

Further, in the instrument panel duct 1 of implementation example 5, in all 20 samples, a balloon-shaped air bubble was not generated on the inner side of the tube body X1 (a balloon phenomenon was absent: ○).

Implementation Example 6

In implementation example 6, in the molding method of implementation example 1 given above, the cooling time was set to be 35 seconds and the molding conditions were adjusted suitably so that the instrument panel duct 1 was molded in which the foaming magnification of the tube body X1 of the instrument panel duct 1 posterior to molding was 3.5 times.

The cell ratio (α1/β1) in implementation example 6 was 89.6 μm/68.9 μm≈1.30.

Further, the surface roughness Sm was 1237 μm.

Further, in the instrument panel duct 1 of implementation example 6, in all 20 samples, a balloon-shaped air bubble was not generated on the inner side of the tube body X1 (a balloon phenomenon was absent: ○).

Implementation Example 7

In implementation example 7, in the molding method of implementation example 6 given above, the cooling time was set to be 45 seconds so that the instrument panel duct 1 was molded in which the foaming magnification of the tube body X1 of the instrument panel duct 1 posterior to molding was 3.5 times.

The cell ratio (α1/β1) in implementation example 7 was 81.7 μm/66.4 μm≈1.23.

Further, the surface roughness Sm was 1051 μm.

Further, in the instrument panel duct 1 of implementation example 7, in all 20 samples, a balloon-shaped air bubble was not generated on the inner side of the tube body X1 (a balloon phenomenon was absent: ○).

Implementation Example 8

In implementation example 8, in the molding method of implementation example 1 given above, the cooling time was set to be 15 seconds and the molding conditions were adjusted suitably so that the instrument panel duct 1 was molded in which the foaming magnification of the tube body X1 of the instrument panel duct 1 posterior to molding was 4.0 times.

The cell ratio ($\alpha 1/\beta 1$) in implementation example 8 was 110.0 μm/85.0μm≈1.29.

Further, the surface roughness Sm was 1287 μm.

Further, in the instrument panel duct 1 of implementation example 8, in all 20 samples, a balloon-shaped air bubble was not generated on the inner side of the tube body X1 (a balloon phenomenon was absent: ○).

Comparison Example 1

In comparison example 1, in the molding method of implementation example 1 given above, the cooling time was set to be 45 seconds so that the instrument panel duct 1 was molded in which the foaming magnification of the tube body X1 of the instrument panel duct 1 posterior to molding was 2.8 times.

The cell ratio ($\alpha 1/\beta 1$) in comparison example 1 was 72.3 μm/66.3 μm≈1.09.

Further, the surface roughness Sm was 1027 μm.

Further, in the instrument panel duct 1 of comparison example 1, in one sample among the 20 samples, a balloon-shaped air bubble was generated on the inner side of the tube body X1 (a balloon phenomenon was present: x).

Comparison Example 2

In comparison example 2, in the molding method of implementation example 1 given above, the cooling time was set to be 55 seconds so that the instrument panel duct 1 was molded in which the foaming magnification of the tube body X1 of the instrument panel duct 1 posterior to molding was 2.8 times.

The cell ratio ($\alpha 1/\beta 1$) in comparison example 1 was 66.1 μm/76.1 μm≈0.87.

Further, the surface roughness Sm was 768 μm.

Further, in the instrument panel duct 1 of comparison example 2, in three samples among the 20 samples, a balloon-shaped air bubble was generated on the inner side of the tube body X1 (a balloon phenomenon was present: x).

Comparison Example 3

In comparison example 3, in the molding method of implementation example 4 given above, the cooling time was set to be 45 seconds so that the instrument panel duct 1 was molded in which the foaming magnification of the tube body X1 of the instrument panel duct 1 posterior to molding was 2.0 times.

The cell ratio ($\alpha 1/\beta 1$) in comparison example 3 was 72.3 μm/65.1 μm≈1.11.

Further, the surface roughness Sm was 688 μm.

Further, in the instrument panel duct 1 of comparison example 3, in one sample among the 20 samples, a balloon-shaped air bubble was generated on the inner side of the tube body X1 (a balloon phenomenon was present: x).

Comparison Example 4

In comparison example 4, in the molding method of implementation example 6 given above, the cooling time was set to be 55 seconds so that the instrument panel duct 1 was molded in which the foaming magnification of the tube body X1 of the instrument panel duct 1 posterior to molding was 3.5 times.

The cell ratio ($\alpha 1/\beta 1$) in comparison example 4 was 71.9 μm/69.8 μm≈1.03.

Further, the surface roughness Sm was 856 μm.

Further, in the instrument panel duct 1 of comparison example 4, in two samples among the 20 samples, a balloon-shaped air bubble was generated on the inner side of the tube body X1 (a balloon phenomenon was present: x).

The test results of the implementation examples 1 to 8 and comparison examples 1 to 4 are shown in FIG. 13.

As seen from the test results shown in FIG. 13, it has been found that when the bubble ratio ($\alpha 1/\beta 1$) of the tube body X1 posterior to molding is 1.2 or higher and the surface roughness Sm is 1000 μm or greater, the instrument panel duct 1 can be molded in which a balloon-shaped air bubble is not generated on the inner side of the tube body X1.

Further, it has been found that when the cooling time is set to be 35 seconds or shorter, regardless of the foaming magnification, the instrument panel duct 1 can be molded in which a balloon-shaped air bubble is not generated on the inner side of the tube body X1.

<Operation and Effects of Instrument Panel Duct 1 of Present Embodiment>

As such, like in the instrument panel duct 1 of the present embodiment is molded such that: cooling by compressed gas is performed in a short time (e.g., 35 seconds) so that cooling solidification is performed on approximately 50 to 80 percent of the foamed parison 13 measured from the cavity 10*a* or 10*b* side in the thickness direction of the tube body X1 and the foamed parison 13 on the inner surface side of the tube body X1 is maintained intact in a molten state; and, after that, cooling by compressed gas is not performed and hence the remaining foamed parison 13 in a molten state is naturally solidified in a state of mold clamping by the split metallic molds 12*a* and 12*b*. By virtue of this, a balloon-shaped air bubble 81 shown in FIG. 23 is not generated and hence, the instrument panel duct 1 can be molded in which as shown in FIG. 9, in a situation of being divided into two equal parts in the thickness direction T of the tube body X1, the average cell diameter $\alpha 1$ in the thickness direction T on the inner surface side A of the tube body X1 is 1.2 times or greater of the average cell diameter $\beta 1$ in the thickness direction T on the outer surface side B of the tube body X1 and the surface roughness Sm of the inner surface of the tube body X1 is 1000 μm or greater.

(Another Exemplary Molding Method)

Next, another molding method for the instrument panel duct 1 serving as an embodiment given above is described below with reference to FIG. 14.

In the another molding method described here, in place of the process that the foamed parison 13 of cylindrical shape is extruded and molded between the split metallic molds 12*a* and 12*b* in the molding method described above, as shown in FIG. 14, molten resin of sheet shape is extruded and molded between the split metallic molds 12*a* and 12*b*.

Figure 14:
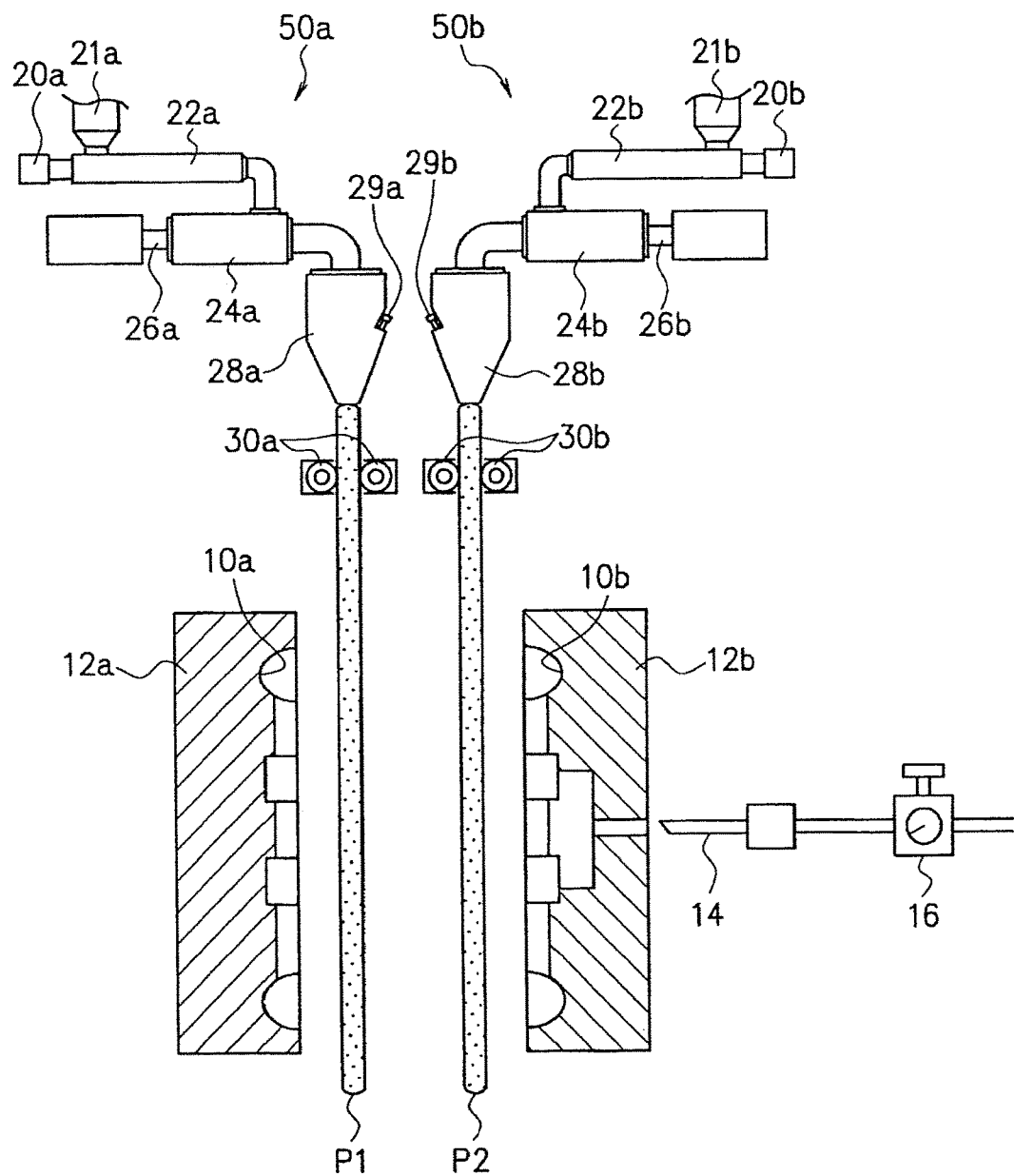
FIG. 14 is a diagram showing another exemplary molding method.

As shown in FIG. 14, a molding apparatus employed in the another molding method is constructed such as to include two extruding machines 50*a* and 50*b* and split metallic molds 12*a* and 12*b* similar to those in the exemplary molding method described above.

The extruding machines 50 (50*a*, 50*b*) are arranged such that molten resin sheets P1 and P2 formed from foamed resin in a molten state composed of a construction material similar to that of the foamed parison 13 in the exemplary molding method described above are hung approximately in parallel to each other at a predetermined interval between the split metallic molds 12a and 12b. Adjustment rollers 30a and 30b are arranged under T-dies 28a and 28b for extruding the molten resin sheets P1 and P2. Then, the thickness or the like is adjusted by these adjustment rollers 30a and 30b. The molten resin sheets P1 and P2 extruded as such are pinched and mold-clamped by the split metallic molds 12a and 12b so that molding is performed.

The two extruding machines 50 (50a, 50b) have similar configurations to each other. Thus, one extruding machine 50 is described below with reference to FIG. 14.

The extruding machine 50 is constructed such as to include: a cylinder 22 to which a hopper 21 is attached; a screw (not shown) provided in the inside of the cylinder 22; a hydraulic motor 20 linked to the screw; an accumulator 24 whose inside is in fluid communication with the cylinder 22; a plunger 26 provided in the inside of the accumulator 24; a T-die 28; and a pair of adjustment rollers 30.

Resin pellets supplied from the hopper 21 are melted and kneaded in the cylinder 22 in association with revolution of the screw by the hydraulic motor 20. Then, the resin in a molten state is transferred to the accumulator 24 and then stored in a fixed amount. Then, the molten resin is transferred toward the T-die 28 in association with driving of the plunger 26. As such, a continuous molten resin sheet composed of resin in a molten state is extruded through an extrusion slit at the T-die 28 lower end and then fed downward with being pinched by the pair of adjustment rollers 30 arranged with an interval in between so as to be hung between the split metallic molds 12a and 12b.

Further, the T-die 28 is provided with a die bolt 29 for adjusting the slit interval of the extrusion slit. As for the adjustment mechanism for the slit interval, in addition to this mechanism of mechanical type employing the die bolt 29, another publicly-known adjustment mechanism of diverse kind may be employed.

According to such a configuration, the molten resin sheets P1 and P2 containing bubble cells in the inside are extruded through the extrusion slits of the two T-dies 28a and 28b, then adjusted such as to have uniform thickness in the up and down directions (indicating the direction of extrusion), and then hung between the split metallic molds 12a and 12b.

As such, when the molten resin sheets P1 and P2 have been arranged between the split metallic molds 12a and 12b, the split metallic molds 12a and 12b are horizontally moved forward so that a molding flask (not shown) located in the outer periphery of the split metallic molds 12a and 12b is brought into contact with the molten resin sheets P1 and P2. As such, after the molten resin sheets P1 and P2 have been held by the molding flask in the split metallic molds 12a and 12b outer periphery, the molten resin sheets P1 and P2 are vacuum-suctioned to the cavities 10a and 10b of the split metallic molds 12a and 12b so that the molten resin sheets P1 and P2 are formed into shapes in accordance with the cavities 10a and 10b.

Then, the split metallic molds 12a and 12b are horizontally moved forward so as to perform mold clamping. Then, similarly to the molding method described above, the blow-in needle 14 and the blow-out needles 15 are inserted into the molten resin sheets P1 and P2 and then compressed gas such as air is blown in through the blow-in needle 14 to the inside of the molten resin sheets P1 and P2. At the same time, the compressed gas is blown off from the inside of the molten resin sheets P1 and P2 through the blow-out needles 15. As such, the inner side of the portion expected to constitute the tube body X1 of the instrument panel duct 1 is cooled.

Then, the split metallic molds 12a and 12b are horizontally moved backward so that the split metallic molds 12a and 12b are released from the instrument panel duct 1.

Here, in the molten resin sheets P1 and P2 hung between the pair of split metallic molds 12a and 12b, in order to avoid occurrence of thickness variation owing to draw down, neck in, or the like, the thickness of the resin sheet, the extrusion rate, the thickness distribution in the direction of extrusion, and the like need be adjusted individually.

Such adjustment of the thickness of the resin sheet, the extrusion rate, the thickness in the direction of extrusion, and the like may be performed by a publicly-known method of diverse kind.

As described above, also according to the another exemplary molding method shown in FIG. 14, similarly to the molding method described in FIGS. 4 to 6, the instrument panel duct 1 of the present embodiment can preferably be molded. Further, in the another exemplary molding method shown in FIG. 14, when the material, the foaming magnification, the thickness, or the like is set to be different between the two molten resin sheets P1 and P2, the instrument panel duct 1 corresponding to various kinds of conditions can also be molded.

Here, the embodiment given above has been described for the example of the instrument panel duct 1 shown in FIG. 1. However, the configuration of the instrument panel duct 1 of the present embodiment is not limited to that shown in FIG. 1 and an arbitrary shape may be employed as long as it is an instrument panel duct obtained such that foamed resin in a molten state is arranged between the split metallic molds 12a and 12b and then clamped by the split metallic molds 12a and 12b and, after that, the foamed resin is pressed against the split metallic molds 12a and 12b by a pressing force of compressed gas such as air so that molding is performed.

(Second Embodiment)

Next, a second embodiment is described below.

In the first embodiment, as shown in FIG. 9, in a situation of being divided into two equal parts in the thickness direction T of the instrument panel duct 1, the average cell diameter $\alpha 1$ in the thickness direction T on the inner surface side A of the instrument panel duct 1 has been set to be 1.2 times or greater of the average cell diameter $\beta 1$ in the thickness direction T on the outer surface side B of the instrument panel duct 1 and the surface roughness Sm of the inner surface of the instrument panel duct 1 has been set to be 1000 µm or greater. By virtue of this, generation of a balloon-shaped air bubble 81 shown in FIG. 23 has been suppressed.

In the second embodiment, at the time that the instrument panel duct in which the plate-shaped part Y8 is connected to the tube body X8 is to be molded, it is inspected whether a balloon-shaped air bubble 81 has been generated on the inner side of the tube body X8 to which the plate-shaped part Y8 is connected. Then, a defective instrument panel duct in which a balloon-shaped air bubble 81 has been generated is removed. By virtue of this, generation of a balloon-shaped air bubble 81 shown in FIG. 23 can be suppressed.

Here, the balloon-shaped air bubble 81 is generated on the inner side of the tube body X8 to which the plate-shaped part Y8 is connected. Thus, in a case that the instrument panel duct has a complicated shape, it is difficult for an inspector to visually check directly the inner side of the tube body X8 to which the plate-shaped part Y8 is connected. Such complicated shapes include, for example, a case that the instrument panel duct has a bent shape.

Thus, gas is supplied to the inside of the instrument panel duct by using a blower and then an inspector judges by the ear whether abnormal sound is occurring. Then, in case of occurrence of abnormal sound, it is judged that a balloon-shaped air bubble 81 has been generated on the inner side of the tube body X8. Thus, the defective instrument panel duct is removed.

Nevertheless, in a case that the inspector judges by the ear whether abnormal sound is occurring, this indicates that subjective judgment is performed by the inspector. This causes a possibility of occurrence of a situation that a defective unit cannot be removed. This is because such abnormal sound is different also depending on the size of the balloon-shaped air bubble 81 and hence it is difficult to judge by the ear whether abnormal sound is occurring. Further, gas need be supplied to the inside of the instrument panel duct by using a blower. This causes an increase in the inspection cost in comparison with a case of visual checking. Further, a longer inspection time becomes necessary.

Thus, it is preferable that an instrument panel duct in which whether a balloon-shaped air bubble 81 have been generated can visually be checked is obtained. Hereinafter, an instrument panel duct in which whether a balloon-shaped air bubble 81 have been generated can visually be checked is described below in detail.

<Exemplary Configuration of Instrument Panel Duct 1>

Figure 15:
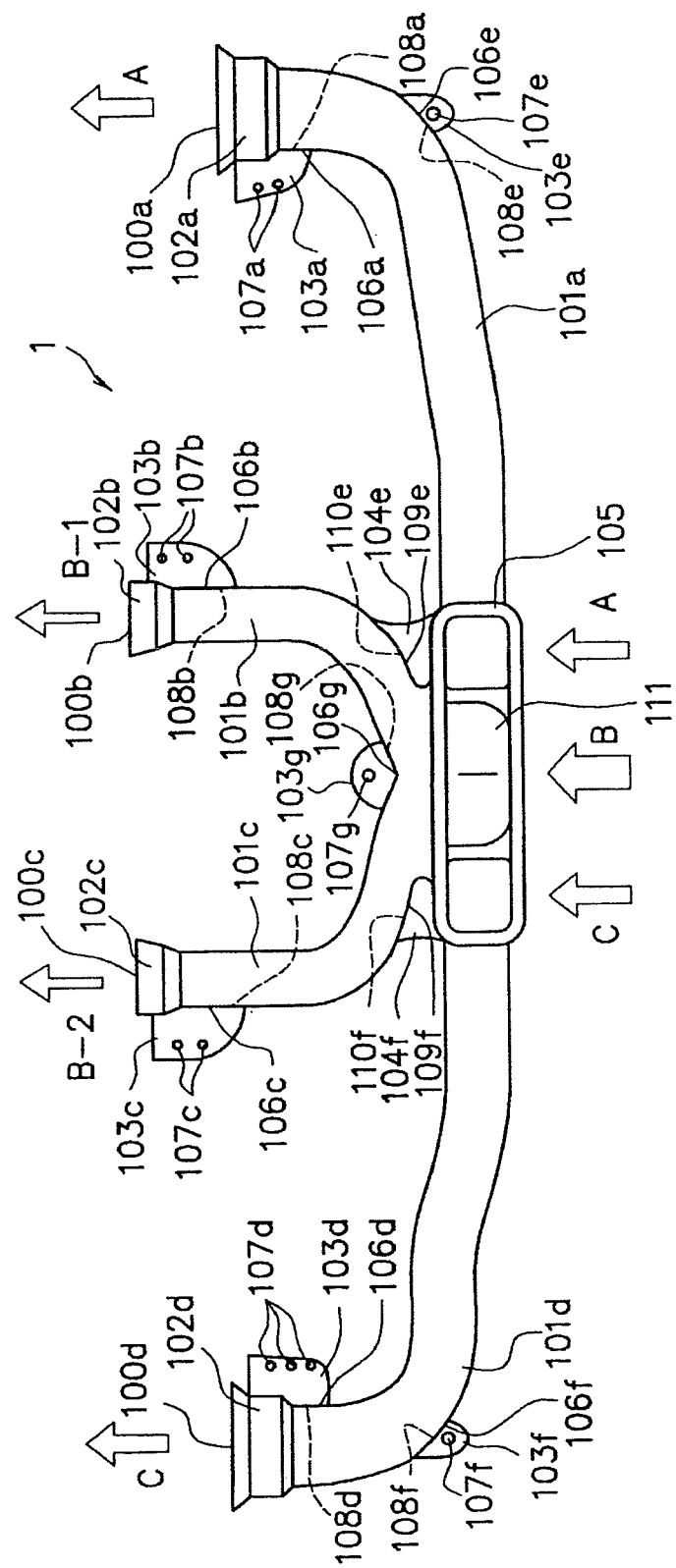
FIG. 15 is a plan view showing an instrument panel duct 1 of the present embodiment.
Figure 16:
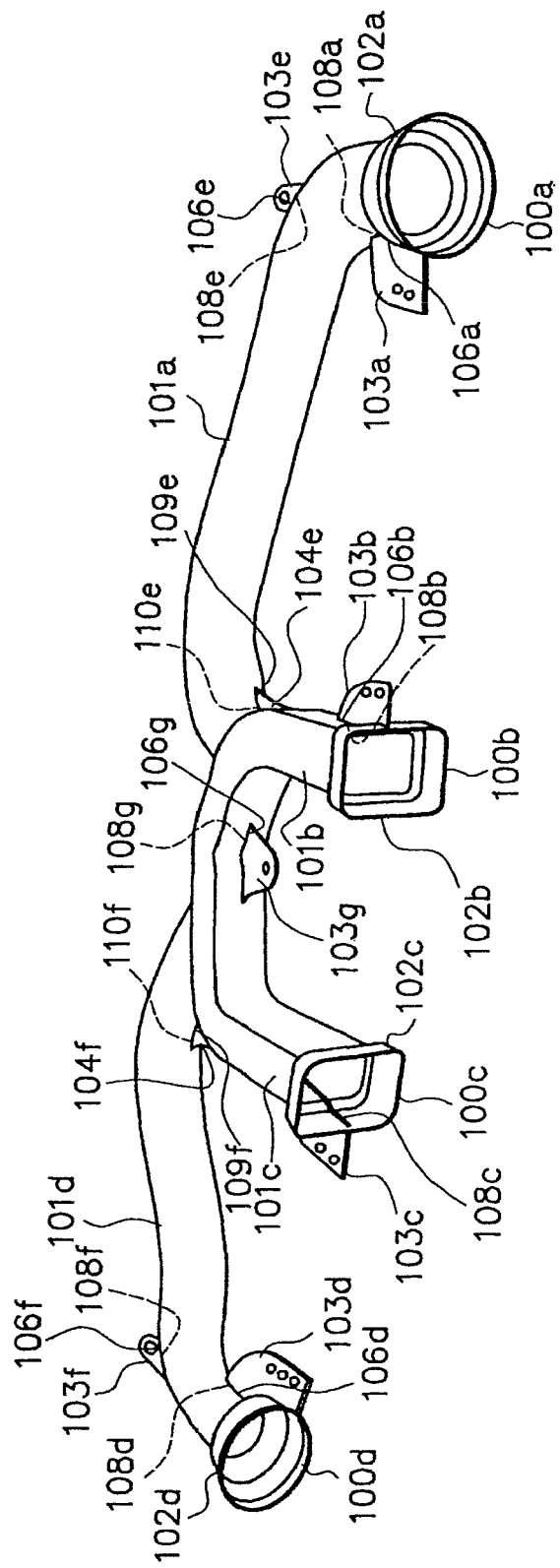
FIG. 16 is a perspective view showing an instrument panel duct 1 of the present embodiment.
Figure 17:
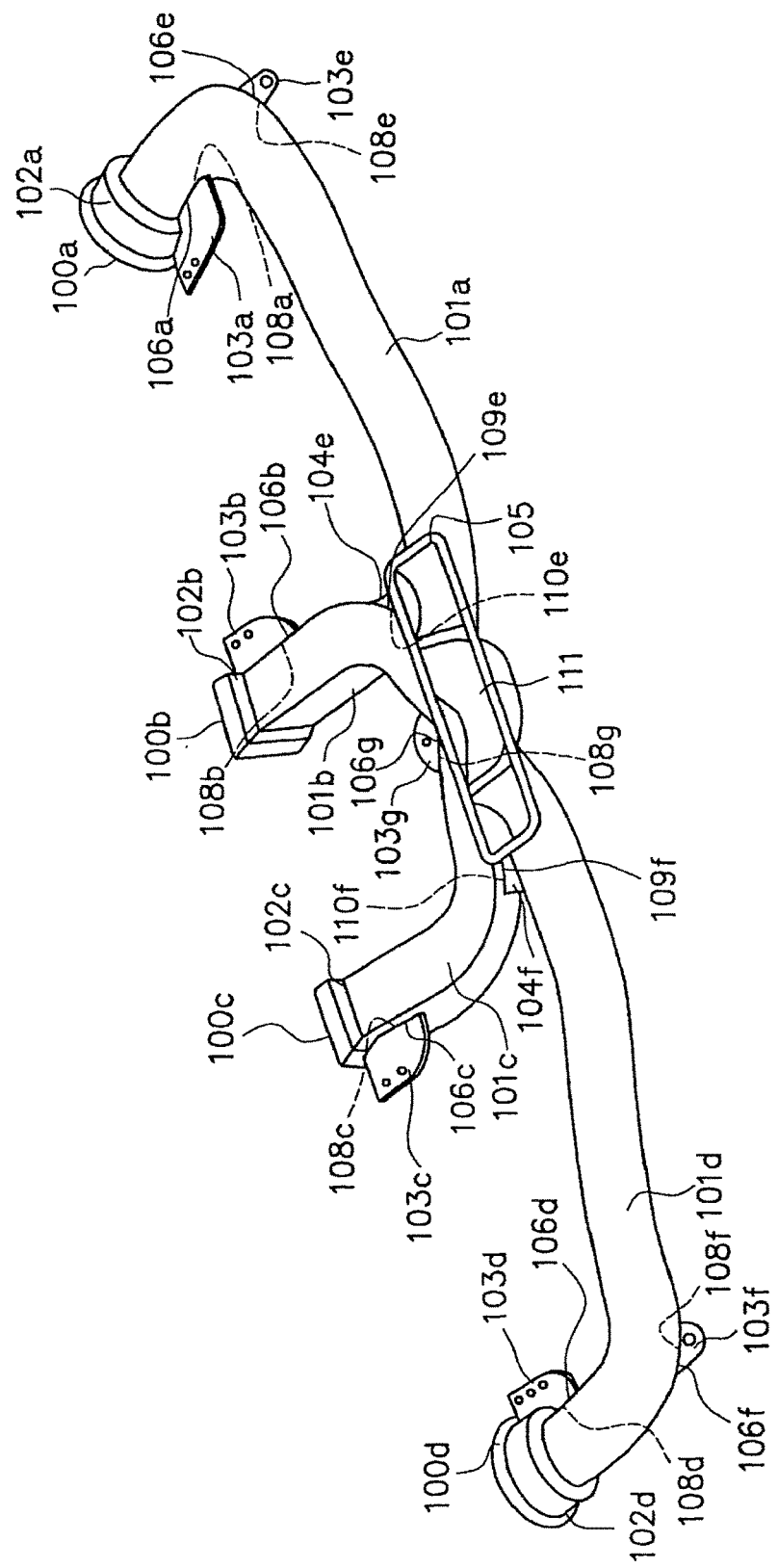
FIG. 17 is a perspective view showing an instrument panel duct 1 of the present embodiment.
Figure 18:
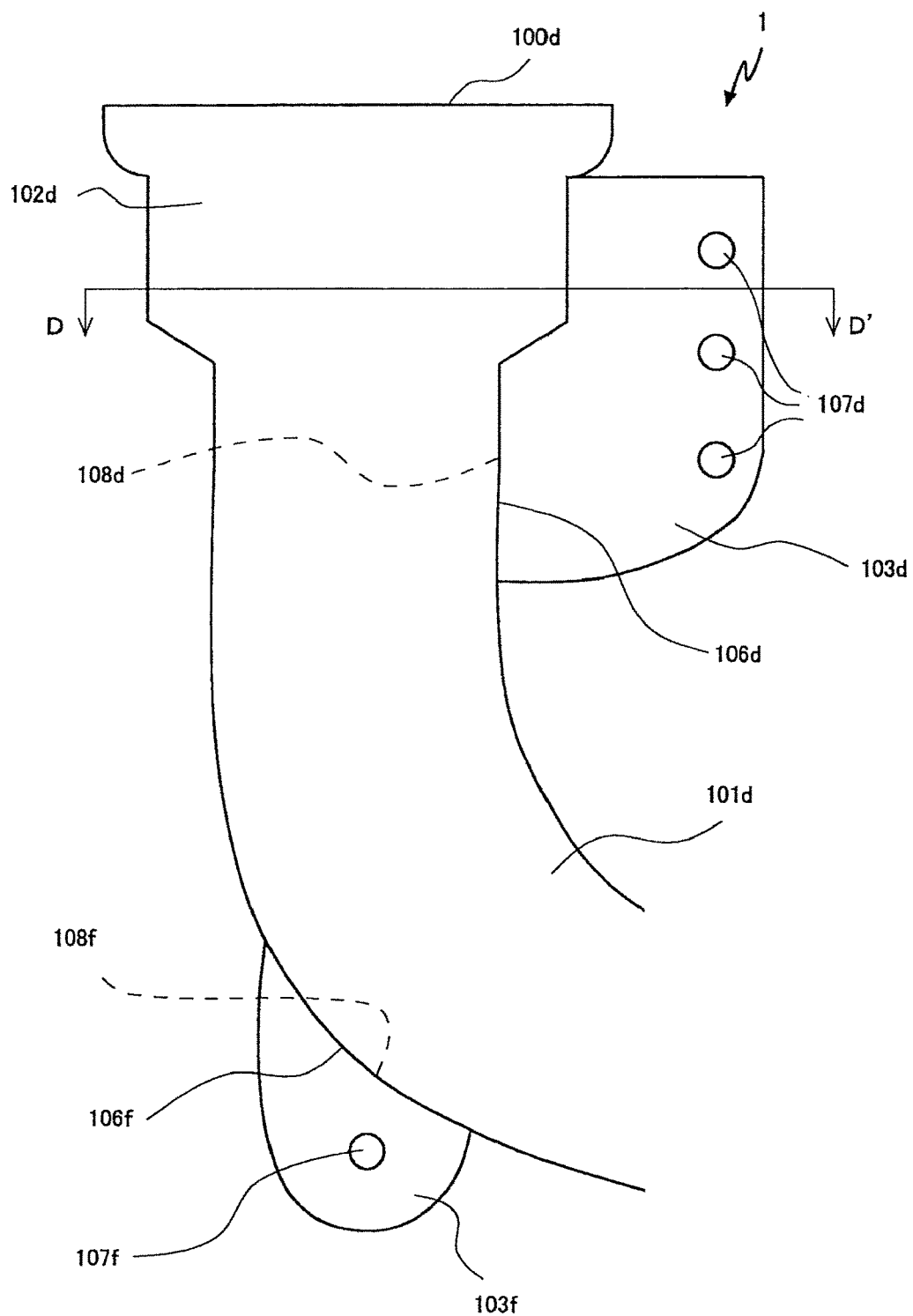
FIG. 18 is a diagram showing a fitting part 102d periphery in an instrument panel duct 1.
Figure 19:
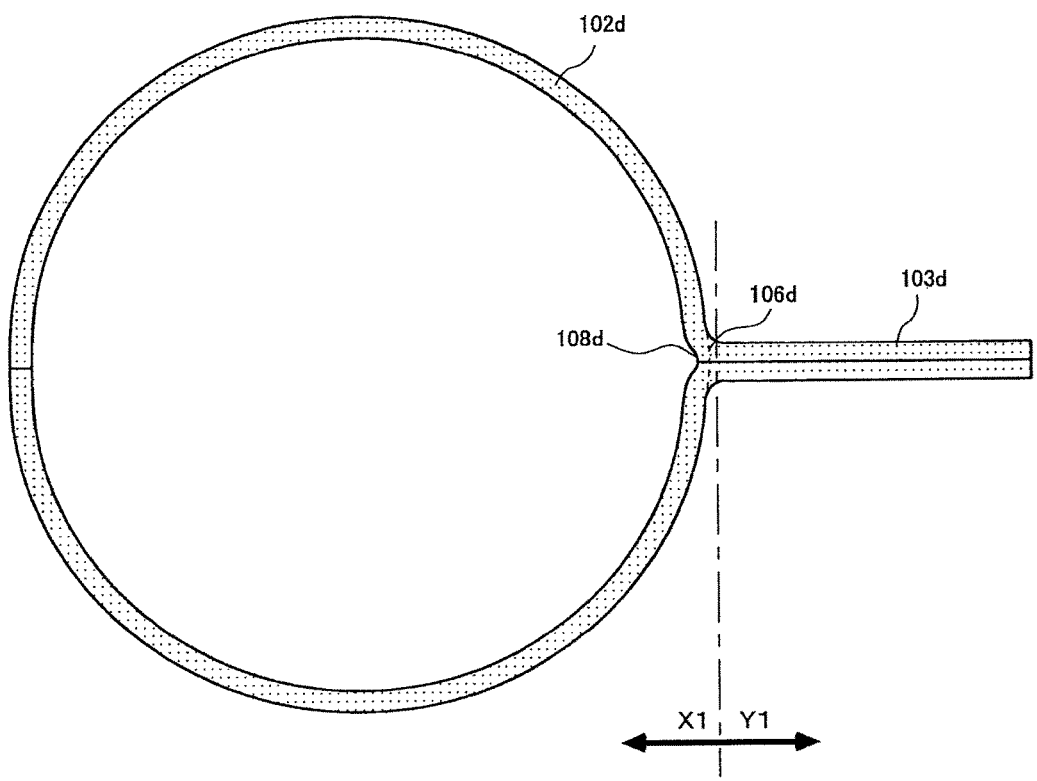
FIG. 19 is a sectional view taken along line D-D' in FIG. 18.

First, with reference to FIGS. 15 to 19, an exemplary configuration of an instrument panel duct 1 of the present embodiment is described below. FIG. 15 is an outline plan view of the instrument panel duct 1, which shows one face of the instrument panel duct 1 on a side where the supply part 105 is provided. FIGS. 16 and 17 are outline perspective views of the instrument panel duct 1. FIG. 16 shows a diagram viewed from the fitting part 102 (102a to 102d) side. FIG. 17 shows a diagram viewed from the supply part 105 side. FIG. 18 shows an outline plan view of the supply part 102d periphery shown in FIG. 15. FIG. 19 shows a sectional view taken along line D-D' in FIG. 18.

The instrument panel duct 1 of the present embodiment is a lightweight instrument panel duct 1 for circulating, to a desired site, heating and cooling air supplied from an air conditioning unit.

As shown in FIG. 15, in the instrument panel duct 1 of the present embodiment, a supply port 105 to be connected to an air conditioning unit (not shown) is provided at one end of a tube part 101 (101a to 101d). Further, a fitting part 102 (102a to 102d) is provided at the other end of the tube part 101 (101a to 101d). Further, a flange 103 (103a to 103g) is connected to the tube body X1 (see FIG. 19) constructed from the tube part 101 (101a to 101d), the supply part 105, and the fitting part 102 (102a to 102d). The tube body X1 is constructed from a closed cell structure having a plurality of air bubbles whose foaming magnification is 2.5 times or greater (e.g., the closed cell rate is 70% or higher). The average thickness of the tube body X1 is 2.0 mm or greater.

In the instrument panel duct 1 of the present embodiment, as shown in FIGS. 15 to 17, the flange 103 (103a to 103g) is connected to the outer side of the tube body X1 (see FIG. 19). Then, a connection inner surface 108 (108a to 108g) on the inner side of the tube body X1 opposite to a connection outer surface 106 (106a to 106g) which is the connected portion can visually be recognized through at least any one of the opening parts 100 (100a to 100d) and 111 of the fitting part 102 (102a to 102d) and the supply part 105. The tube body X1 indicates a portion constructed from the tube part 101 (101a to 101d), the supply part 105, and the fitting part 102 (102a to 102d). As shown in FIG. 19, the connection outer surface 106 (106d in FIG. 19) indicates a portion where the tube body X1 (the fitting part 102d in FIG. 19) and the flange 103 (103d in FIG. 19) are connected to each other. The connection inner surface 108 (108d in FIG. 19) indicates the inner side face of the tube body X1 opposite to the connection outer surface 106 (106d in FIG. 19).

In the instrument panel duct 1 of the present embodiment, the connection inner surface 108 (108a to 108g) can visually be recognized through at least any one of the opening parts 100 (100a to 100d) and 111 of the fitting part 102 (102a to 102d) and the supply part 105. Thus, the inspector who inspects the instrument panel duct 1 for a defective unit can visually recognize the entire region of the connection inner surface 108 (108a to 108g) through at least any one of the opening parts 100 (100a to 100d) and 111 of the fitting part 102 (102a to 102d) and the supply part 105 and thereby can visually check whether a balloon-shaped air bubble 81 (see FIG. 23) has been generated in the connection inner surface 108.

For example, as shown in FIG. 16, the connection inner surfaces 108a and 108e on the inner side of the tube body X1 opposite to the connection outer surfaces 106a and 106e which are the portions where the flanges 103a and 103e are connected to the outer side of the tube body X1 can visually be recognized entirely through the opening part 100a of the fitting part 102a.

Thus, the inspector can visually recognize the entire regions of the connection inner surfaces 108a and 108e through the opening part 100a of the fitting part 102a and thereby can visually check whether a balloon-shaped air bubble 81 (see FIG. 23) has been generated in the connection inner surfaces 108a and 108e.

Further, as shown in FIG. 16, the connection inner surface 108b on the inner side of the tube body X1 opposite to the connection outer surface 106b which is the portion where the flange 103b is connected to the outer side of the tube body X1 can visually be recognized entirely through the opening part 100b of the fitting part 102b.

Thus, the inspector can visually recognize the entire region of the connection inner surface 108b through the opening part 100b of the fitting part 102b and thereby can visually check whether a balloon-shaped air bubble 81 (see FIG. 23) has been generated in the connection inner surface 108b.

Further, as shown in FIG. 17, the connection inner surface 108g on the inner side of the tube body X1 opposite to the connection outer surface 106g which is the portion where the flange 103g is connected to the outer side of the tube body X1 can visually be recognized entirely through the opening part 111 of the supply part 105.

Thus, the inspector can visually recognize the entire region of the connection inner surface 108g through the opening part 111 of the supply part 105 and thereby can visually check whether a balloon-shaped air bubble 81 (see FIG. 23) has been generated in the connection inner surface 108g.

Further, as shown in FIG. 16, the connection inner surface 108c on the inner side of the tube body X1 opposite to the connection outer surface 106c which is the portion where the flange 103c is connected to the outer side of the tube body X1 can visually be recognized entirely through the opening part 100c of the fitting part 102c.

Thus, the inspector can visually recognize the entire region of the connection inner surface 108c through the opening part 100c of the fitting part 102c and thereby can visually check whether a balloon-shaped air bubble 81 (see FIG. 23) has been generated in the connection inner surface 108c.

Further, as shown in FIG. 16, the connection inner surfaces 108d and 108f on the inner side of the tube body X1 opposite to the connection outer surfaces 106d and 106f which are the portions where the flanges 103d and 103f are connected to the outer side of the tube body X1 can visually be recognized entirely through the opening part 100d of the fitting part 102d.

Thus, the inspector can visually recognize the entire regions of the connection inner surfaces 108d and 108f through the opening part 100d of the fitting part 102d and thereby can visually check whether a balloon-shaped air bubble 81 (see FIG. 23) has been generated in the connection inner surfaces 108d and 108f.

Further, in the instrument panel duct 1 of the present embodiment, a bridging part 104 (104e, 104f) is connected to the outer side of the tube body X1. Then, a connection inner surface 110 (110e, 110f) on the inner side of the tube body X1 opposite to a connection outer surface 109 (109e, 109f) which is the connected portion can visually be recognized through the opening part 100 (100b, 100c) of the fitting part 102 (102b, 102c) and the opening part 111 of the supply part 105.

Thus, the inspector who inspects the instrument panel duct 1 for a defective unit can visually recognize the region of the connection inner surface 110 (110e, 110f) through at least any one of the opening parts 100 (100b, 100c) and 111 of the fitting part 102 (102b, 102c) and the supply part 105 and thereby can visually check whether a balloon-shaped air bubble 81 (see FIG. 23) has been generated in the connection inner surface 110 (110e, 110f).

For example, as shown in FIGS. 16 and 17, the connection inner surface 110e on the inner side of the tube body X1 opposite to the connection outer surface 109e which is the portion where the bridging part 104e is connected to the outer side of the tube body X1 can visually be recognized through the opening part 100b of the fitting part 102b and the opening part 111 of the supply part 105.

Thus, the inspector can visually recognize the region of the connection inner surface 110e through the opening parts 100b and 111 of the fitting part 102b and the supply part 105 and thereby can visually check whether a balloon-shaped air bubble 81 (see FIG. 23) has been generated in the connection inner surface 110e.

Further, as shown in FIGS. 16 and 17, the connection inner surface 110f on the inner side of the tube body X1 opposite to the connection outer surface 109f which is the portion where the bridging part 104f is connected to the outer side of the tube body X1 can visually be recognized through the opening part 100c of the fitting part 102c and the opening part 111 of the supply part 105.

Thus, the inspector can visually recognize the region of the connection inner surface 110f through the opening parts 100c and 111 of the fitting part 102c and the supply part 105 and thereby can visually check whether a balloon-shaped air bubble 81 (see FIG. 23) has been generated in the connection inner surface 110f.

The situation that the connection inner surface 108 or 110 can visually be recognized through the opening part 100 or 111 of the fitting part 102 or the supply part 105 indicates that when light is projected through the opening part 100 or 111 to the inside of the tube body X1, the projected light directly hits the region of the connection inner surface 108 or 110.

Figure 20:
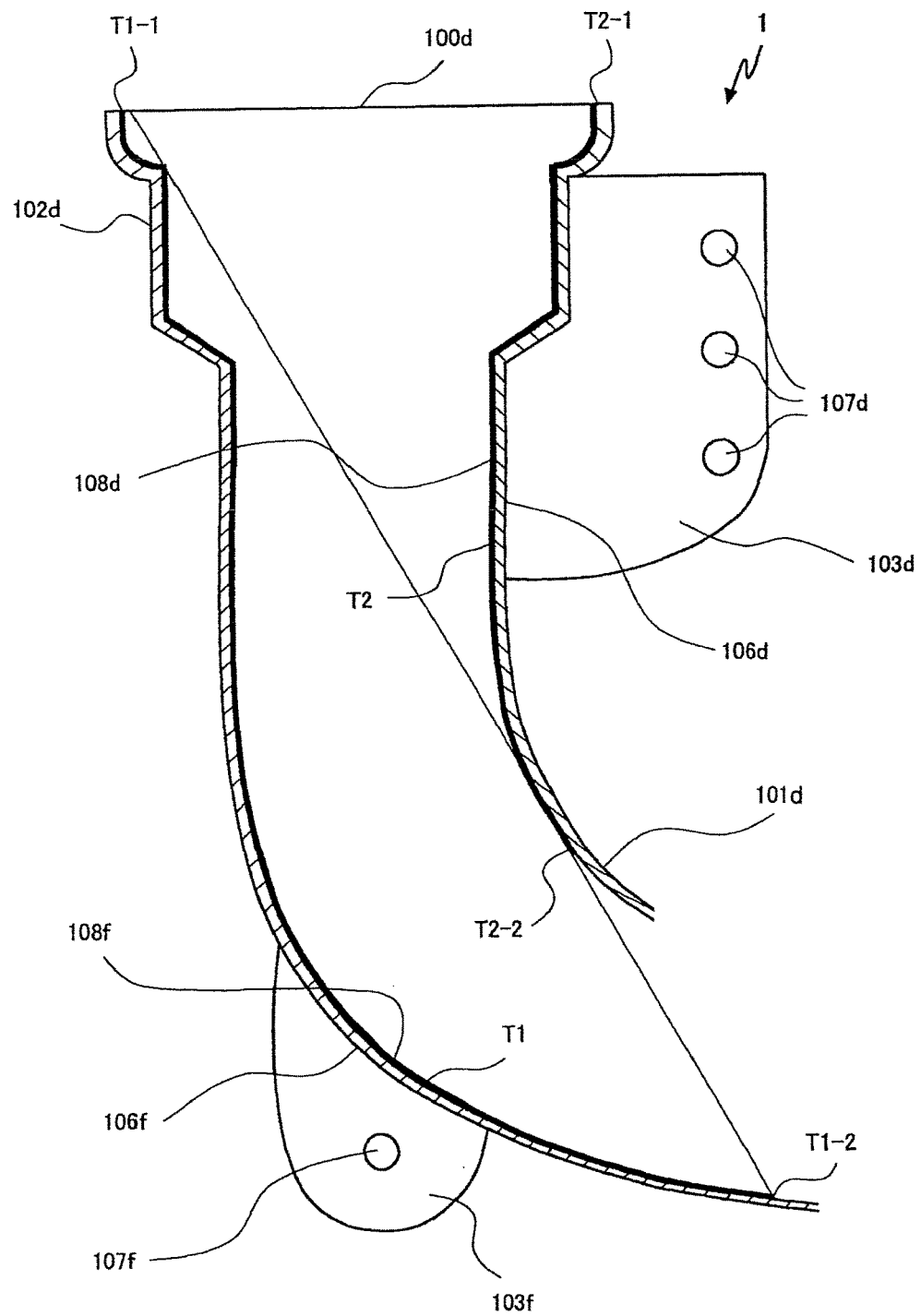
FIG. 20 is a first diagram showing a cross section of a fitting part 102d periphery in an instrument panel duct 1.

For example, as shown in FIG. 20, when light is projected at various angles from the opening part 100d of the fitting part 102d to the inside of the tube body X1 (the portion constructed from the fitting part 102d and the tube part 101 d in FIG. 20), the light hits the regions T1 and T2 shown in FIG. 20. The regions T1 and T2 indicate regions directly hit by the light on the inner side of the tube body X1. The region T1 indicates a range between T1-1 and T1-2 and the region T2 indicates a range between T2-1 and T2-2. FIG. 20 is a diagram showing the cross section of the tube body X1 in the fitting part 102d periphery shown in FIG. 18, which shows a cross section of the tube body X1 sectioned in a direction parallel to the passage advancement direction. The passage advancement direction indicates a direction perpendicular to the thickness direction and the circumferential direction of the instrument panel duct 1 and hence indicates the direction A, B (B-1, B-2), or C shown in FIG. 15. In the instrument panel duct 1 of the present embodiment, when the flange 103 is provided such that the connection inner surface 108 is located in the region T1 or T2 shown in FIG. 20, the inspector can visually recognize the entire region of the connection inner surface 108 through the opening parts 100 and 111. Here, FIG. 20 shows the cross-sectional shape of the fitting part 102 periphery where the flange 103 is connected to the tube body X1. However, also in the portion where the bridging part 104 is connected to the tube body X1, similarly to the flange 103 described above, the bridging part 104 is provided such that the connection inner surface 110 is located in the region T1 or T2 hit by the light. By virtue of this, the inspector can visually recognize the entire region of the connection inner surface 110 through the opening parts 100 and 111.

Here, in the instrument panel duct 1 of the present embodiment, the aperture area of the opening part 100 of the fitting part 102 is set to be larger than the aperture area of the tube part 101. The aperture area of the tube part 101 indicates the area of the opening part of the tube part 101 sectioned in a direction perpendicular to the passage advancement direction of the instrument panel duct 1 in the site of the tube part 101. This permits easy visual recognition of the region of the connection inner surface 108 through the opening part 100 of the fitting part 102. Further, the regions T1 and T2 where light projected through the opening part 100 is directly projected on the inner surface of the tube body X1 can be widened. Thus, the region where the flange 103 may be provided can be widened. As a result, restrictions on the region where the flange 103 is to be provided in the tube body X1 can be relaxed. In order that the aperture area of the opening part 100 of the fitting part 102 may be made larger than the aperture area of the tube part 101, this configuration can be achieved, for example, when the shape of the fitting part 102 is constructed in a trumpet shape. The trumpet shape indicates a shape in which the aperture area increases as going toward an open end.

Figure 21:
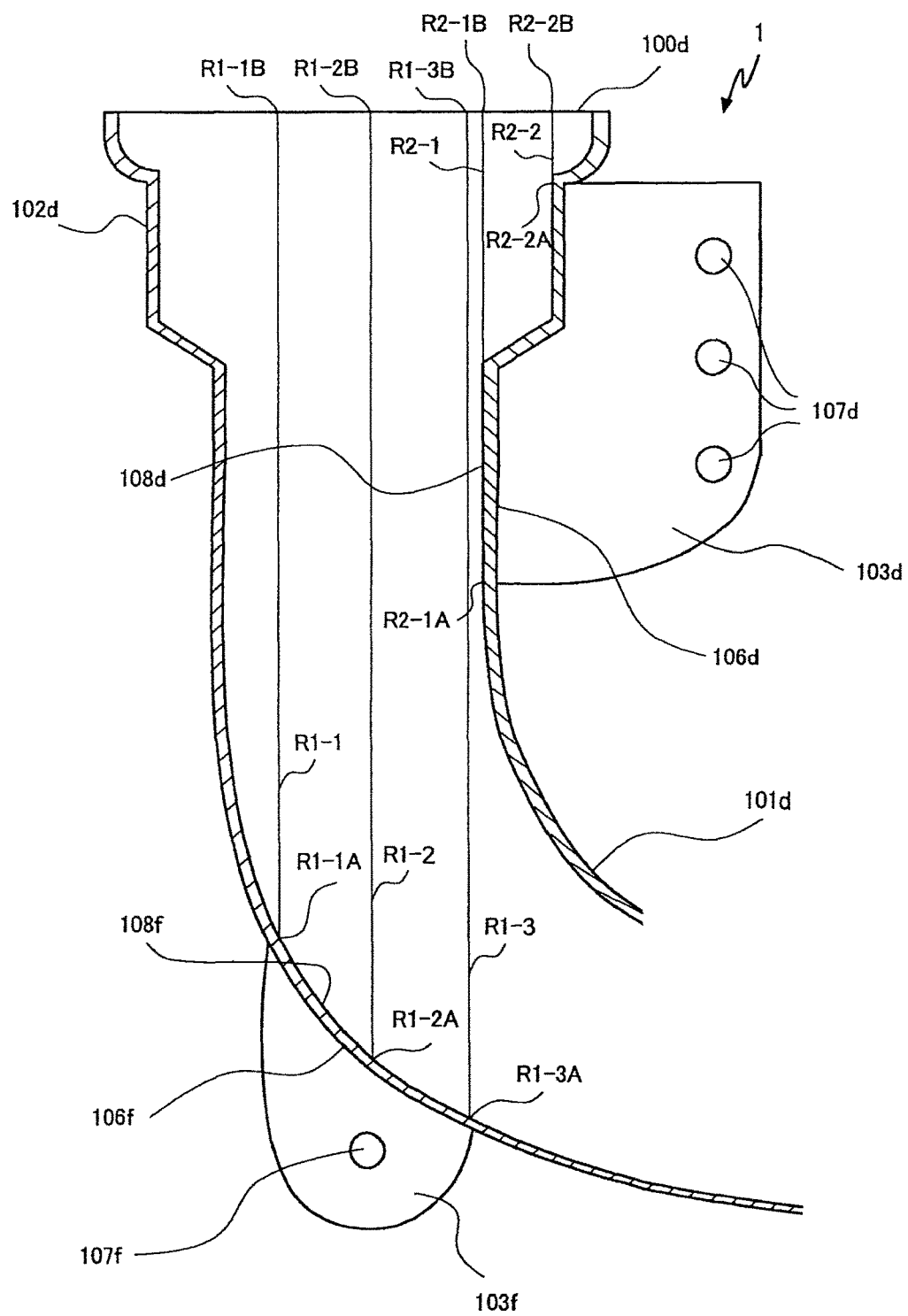
FIG. 21 is a second diagram showing a cross section of a fitting part 102d periphery in an instrument panel duct 1.

Here, when the flange 103 is to be provided in the tube body X1, it is preferable that as shown in FIG. 21, a shortest distance R1-1 to R1-3 and R2-1 to R2-2 obtained when each of arbitrary portions R1-1A to R1-3A and R2-1A to R2-2A of the connection inner surface 108 is joined by a straight line to each of arbitrary portions R1-1B to R1-3B and R2-1B to R2-2B of the opening part 100 through which the arbitrary portions R1-1A to R1-3A and R2-1A to R2-2A of the connection inner surface 108 can visually be recognized is 30 cm or smaller in all portions of the connection inner surface 108. Each of R1-1 to R1-3 indicates the shortest distance obtained when each of arbitrary portions R1-1A to R1-3A of the connection inner surface 108f is joined by a straight line to each of arbitrary portions R1-1B to R1-3B of the opening part 100 through which the arbitrary portions R1-1A to R1-3A of the connection inner surface 108f can visually be recognized. The configuration is made such that these R1-1 to R1-3 become 30 cm or smaller in all portions of the connection inner surface 108f. In the case of the connection inner surface 108f, R1-3 has the longest distance. Thus, the configuration is made such that R1-3 becomes 30 cm or smaller. Each of R2-1 to R2-2 indicates the shortest distance obtained when each of arbitrary portions R2-1A to R2-2A of the connection inner surface 108d is joined by a straight line to each of arbitrary portions R2-1B to R2-2B of the opening part 100 through which the arbitrary portions R2-1A to R2-2A of the connection inner surface 108d can visually be recognized. The configuration is made such that these R2-1 to R2-2 become 30 cm or smaller in all portions of the connection inner surface 108d. In the case of the connection inner surface 108d, R2-1 has the longest distance. Thus, the configuration is made such that R2-1 becomes 30 cm or smaller. By virtue of this, the inspector can easily recognize visually the region of the connection inner surface 108 through the opening part 100. Further, when light is to be projected through the opening part 100 onto the inner surface of the tube body Xi, the light easily hits the connection inner surface 108 without the necessity of adjusting the optical axis.

If there were a portion where the shortest distance becomes longer than 30 cm among the portions of the connection inner surface 108, the inspector would become difficult to visually recognize the portion where the shortest distance becomes longer than 30 cm. At the same time, even when light were projected through the opening part 100 onto the inner surface of the tube body X1, the light would become difficult to hit the connection inner surface 108 until the optical axis were adjusted. Thus, it is preferable that the shortest distance is 30 cm or smaller in all portions of the connection inner surface 108. In particular, it is preferable that the shortest distance is 15 cm or smaller in all portions of the connection inner surface 108. Here, a situation that the shortest distance is 15 cm or smaller in all portions of the connection inner surface 108 indicates that the flange 103 is provided in the opening part 100 periphery. When the flange 103 is provided in the approximately opening part 100 periphery, the connection inner surface 108 can be checked also by touching with the hand through the opening part 100. Further, even when a balloon-shaped air bubble 81 (see FIG. 23) has been generated in the regions of the connection inner surface 108, the balloon-shaped air bubble 81 can easily be cut off with a tool such as a knife. Here, in FIG. 21, the shortest distance R1-1 to R1-3 and R2-1 to R2-2 obtained when each of arbitrary portions R1-1A to R1-3A and R2-1A to R2-2A of the connection inner surface 108 is joined by a straight line to each of arbitrary portions R1-1B to R1-3B and R2-1B to R2-2B of the opening part 100 through which the arbitrary portions R1-1A to R1-3A and R2-1A to R2-2A of the connection inner surface 108 can visually be recognized has been described. However, also for the shortest distance obtained when an arbitrary portion of the connection inner surface 110 is joined by a straight line to an arbitrary portion of the opening parts 100 and 111 through which the arbitrary portion of the connection inner surface 110 can visually be recognized, similarly to FIG. 21, it is preferable that the shortest distance is made to be 30 cm or smaller in all portions of the connection inner surface 110.

In the instrument panel duct 1 of the present embodiment, the flange 103 or the bridging part 104 is provided in the vicinities of all the opening parts 100 and 111 formed in the tube body X1. By virtue of this, the regions of the connection inner surfaces 108 and 110 which are the inner sides of the tube body X1 where the tube body X1 and the flange 103 or the bridging part 104 are connected can easily be visually recognized through the opening parts 100 and 111. Further, the regions of the connection inner surfaces 108 and 110 can be checked also by touching with the hand through the opening parts 100 and 111. Further, even when a balloon-shaped air bubble 81 (see FIG. 23) has been generated in the regions of the connection inner surfaces 108 and 110, the balloon-shaped air bubble 81 can easily be cut off with a tool such as a knife.

Here, the inspector who inspects the instrument panel duct 1 visually recognizes the regions of the connection inner surfaces 108 and 110 through the opening parts 100 and 111 of the instrument panel duct 1, then visually checks whether a balloon-shaped air bubble 81 (see FIG. 23) has been generated in the connection inner surfaces 108 and 110, and then removes a defective instrument panel duct in which a balloon-shaped air bubble 81 has been generated in the connection inner surfaces 108 and 110. In this case, when the aperture area of the opening part 100 or 111 is large, the region of the connection inner surface 108 or 110 can easily be recognized visually through the opening part 100 or 111 and, when the aperture area of the opening part 100 or 111 is small, the region of the connection inner surface 108 or 110 becomes difficult to be visually recognized through the opening part 100 or 111. Thus, it is preferable that the width in the passage advancement direction of the connection portion where the flange 103 or the bridging part 104 is connected to the tube body X1 is set to be a width in accordance with the aperture area of the opening part 100 or 111 formed in the tube body X1. That is, when the aperture area of the opening part 100 or 111 is large, the region where the connection inner surface 108 or 110 can visually be recognized through the opening part 100 or 111 becomes large. Thus, it is preferable that when the aperture area of the opening part 100 or 111 is large, the width in the passage advancement direction of the connection portion is widened. Further, when the aperture area of the opening part 100 or 111 is small, the region where the connection inner surface 108 or 110 can visually be recognized through the opening part 100 or 111 becomes small. Thus, it is preferable that when the aperture area of the opening part 100 or 111 is small, the width in the passage advancement direction of the connection portion is reduced. For example, it is premised that there are three opening parts consisting of a first opening part, a second opening part, and a third opening part and then the aperture areas of the individual opening parts are such that the first opening part>the second opening part>the third opening part. In this case, the aperture area of the first opening part is the largest and hence the region where the connection inner surface 108 or 110 can visually be recognized through the first opening part becomes the largest. Further, the aperture area of the third opening part is the smallest and hence the region where the connection inner surface 108 or 110 can visually be recognized through the third opening part becomes the smallest. Thus, the width in the passage advancement direction of the connection portion constituting the connection inner surface 108 or 110 which can visually be recognized through the first opening part is set to be the largest. Further, the width in the passage advancement direction of the connection portion constituting the connection inner surface 108 or 110 which can visually be recognized through the third opening part is set to be the smallest. As a result, the flange 103 or the bridging part 104 having the largest width in the passage advancement direction of the connection portion is provided in the first opening part, and the flange 103 or the bridging part 104 having the smallest width in the passage advancement direction of the connection portion is provided in the third opening part. When the flange 103 and the bridging part 104 are provided in the tube body X1 in accordance with the aperture area of each opening part, the instrument panel duct 1 can easily be fixed to another tubular member and, at the same time, the regions of the connection inner surfaces 108 and 110 which are the inner sides of the tube body X1 where the tube body X1 and the flange 103 or the bridging part 104 are connected can visually be recognized through the opening parts 100 and 111.

Here, the shape of the flange 103 or the bridging part 104 connected to the outer side of the tube body X1 is not limited to particular one and may be an arbitrary shape as long as the regions of the connection inner surfaces 108 and 110 can visually be recognized through the opening parts 100 and 111. Further, also the position where the flange 103 or the bridging part 104 connected to the outer side of the tube body X1 is not limited to particular one and connection may be performed at an arbitrary position as long as the regions of the connection inner surfaces 108 and 110 can visually be recognized through the opening parts 100 and 111.

The instrument panel duct 1 of the present embodiment can be molded by using the molding apparatus shown in FIG. 4 or 14 described in the first embodiment. Further, the instrument panel duct 1 of the present embodiment can be molded also by a method other than the method that molten resin sheets composed of foamed resin in a molten state extruded from the T-dies 28 shown in FIG. 14 are molded with the metallic molds. For example, foamed sheets formed in advance may be reheated and clamped by the split metallic molds so that molding may be performed. Specifically, two foamed sheets formed in advance are reheated. After that, the softened two foamed sheets are clamped by the split metallic molds and then the foamed sheets are suctioned to the split metallic molds or, alternatively, air is introduced between the two foamed sheets so that the two foamed sheets are brought into close contact with the split metallic molds by the pressure of the air. Also in this case, there is a possibility that a balloon-shaped air bubble 81 (see FIG. 23) is generated in a portion where the two foamed sheets are compressed in an overlapped manner.

In the present embodiment, the inspector who inspects the instrument panel duct 1 for a defective unit recognizes visually the regions of the connection inner surfaces 108 (108a to 108g) and 110 (110e, 110f) through the opening parts 100 (100a to 100d) and 111 of the fitting part 102 (102a to 102d) and the supply part 105, then visually checks whether a balloon-shaped air bubble 81 (see FIG. 23) has been generated in the connection inner surfaces 108 and 110, and then removes a defective instrument panel duct in which a balloon-shaped air bubble 81 has been generated in the connection inner surfaces 108 and 110.

By virtue of this, the instrument panel duct 1 in which a balloon-shaped air bubble 81 is not generated in the opening parts 108 and 110 can be obtained.

As shown in FIG. 15, in the instrument panel duct 1 of the present embodiment, the flange 103 (103a to 103g) and the bridging part 104 (104e, 104f) are provided in the vicinities of all the opening parts 100 (100a to 100d) and 111 formed in the fitting part 102 (102a to 102d) and the supply part 105 constituting the tube body X1. By virtue of this, the connection inner surfaces 108 (108a to 108g) and 110 (110e, 110f) which are the inner side of the tube body X1 where the fitting part 102 (102a to 102d) and the tube part 101 (101a to 101d) constituting the tube body X1 are connected to the flange 103 (103a to 103g) and the bridging part 104 (104e, 104f) can visually be recognized through the opening parts 100 (100a to 100d) and 111 of the fitting part 102 (102a to 102d) and the supply part 105.

Thus, the inspector can visually recognize the regions of the connection inner surfaces 108 (108a to 108g) and 110(110e, 110f) through the opening parts 100 (100a to 100d) and 111 of the fitting part 102 (102a to 102d) and the supply part 105 and thereby can easily check visually whether a balloon-shaped air bubble 81 (see FIG. 23) has been generated in the connection inner surfaces 108 and 110.

Figure 22:
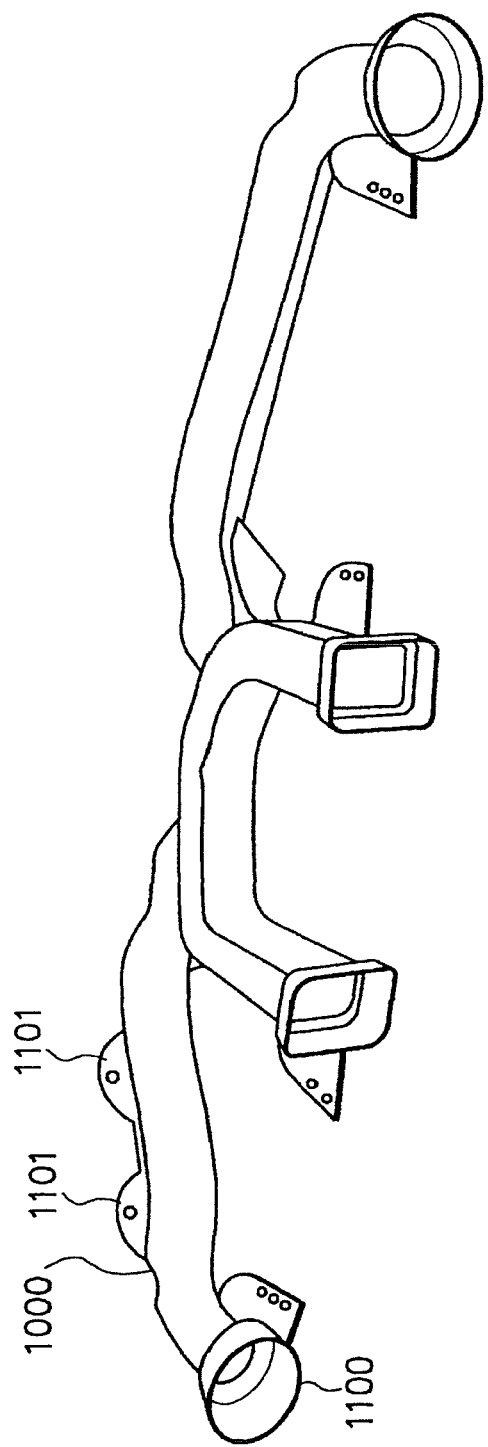
FIG. 22 is a diagram showing an exemplary configuration of an instrument panel duct 1000 used for comparison with an instrument panel duct 1 of the present embodiment, which shows an exemplary configuration that a flange 1101 is provided in a distant site from an opening part 1100.

For example, as shown in FIG. 22, when a flange 1101 is provided in a site distant from the opening part 1100, the connection inner surface which is the inner side of the tube body 1000 where the flange 1101 is connected to the tube body 1000 cannot visually be recognized through the opening part 1101. In this case, whether a balloon-shaped air bubble 81 has been generated in the connection inner surface cannot visually be checked. Thus, gas is supplied to the inside of the instrument panel duct by using a blower and then the inspector judges by the ear whether abnormal sound is occurring. When abnormal sound is occurring, it is judged that a balloon-shaped air bubble 81 has been generated on the inner side of the tube body 1000. Thus, the defective instrument panel duct is removed. Nevertheless, in a case that the inspector judges by the ear whether abnormal sound is occurring, this indicates that subjective judgment is performed by the inspector. This causes a possibility of occurrence of a situation that a defective unit cannot be removed. Further, gas need be supplied to the inside of the instrument panel duct by using a blower. This causes an increase in the inspection cost in comparison with a case of visual checking. Further, a longer inspection time becomes necessary.

Thus, the instrument panel duct 1 of the present embodiment is constructed such that the connection inner surfaces 108 (108a to 108g) and 110 (110e, 110f) which are the inner side of the tube body X1 where the fitting part 102 (102a to 102d) and the tube part 101 (101a to 101d) constituting the tube body X1 are connected to the flange 103 (103a to 103g) and the bridging part 104 (104e, 104f) can visually be recognized through the opening parts 100 (100a to 100d) and 111 of the fitting part 102 (102a to 102d) and the supply part 105. By virtue of this, the inspector can visually recognize the entire regions of the connection inner surfaces 108 (108a to 108g) and 110 (110e, 110f) through the opening parts 100 (100a to 100d) and 111 of the fitting part 102 (102a to 102d) and the supply part 105 and thereby can easily check visually whether a balloon-shaped air bubble 81 (see FIG. 23) has been generated in the connection inner surface 108.

<Operation and Effects of Instrument Panel duct 1 of Present Embodiment>

As such, in the instrument panel duct 1 of the present embodiment, all the connection inner surfaces 108 (108a to 108f) and 110 (110e, 110f) on the inner side of the tube body X1 corresponding to the positions where the flange 103 (103a to 103g) and the bridging part 104 (104e, 104f) serving as a plurality of plate-shaped parts are connected can visually be recognized through the opening parts 100 (100a to 100d) and 111.

Thus, the inspector who inspects the instrument panel duct 1 for a defective unit visually recognizes the entire regions of the connection inner surfaces 108 and 110 through the opening parts 100 and 111 and thereby can visually check whether a balloon-shaped air bubble 81 (see FIG. 23) has been generated in the connection inner surfaces 108 and 110. As a result, a defective instrument panel duct 1 in which a balloon-shaped air bubble 81 has been generated can easily be removed. Further, even in the instrument panel duct 1 in which generation of a balloon-shaped air bubble 81 (see FIG. 23) is suppressed as described in the first embodiment, like in the present embodiment, when whether a balloon-shaped air bubble 81 (see FIG. 23) has been generated is visually checked through the opening parts 100 and 111, generation of a balloon-shaped air bubble 81 can reliably be suppressed.

Here, in the above-mentioned embodiment, construction has been performed such that all the connection inner surfaces 108 (108a to 108f) and 110 (110e, 110f) can visually be recognized through the opening parts 100 (100a to 100d) and 111. However, construction may be performed such that at least a part of the connection inner surfaces 108 (108a to 108f) and 110 (110e, 110f) can visually be recognized through the opening parts 100 (100a to 100d) and 111. Also in this case, whether a balloon-shaped air bubble 81 (see FIG. 23) has been generated in the connection inner surfaces 108 and 110 can visually be checked.

Further, in the instrument panel duct 1 of the present embodiment, it is preferable that the flange 103 or the bridging part 104 is provided in the vicinities of all the opening parts 100 and 111 formed in the tube body X1. The situation that the flange 103 or the bridging part 104 is provided in the vicinities of the opening parts 100 and 111 indicates that the shortest distance obtained when an arbitrary portion of the connection inner surface 108 or 110 is joined by a straight line to an arbitrary portion of the opening parts 100 and 111 through which the arbitrary portion of the connection inner surfaces 108 and 110 can visually be recognized becomes 15 cm or smaller in all portions of the connection inner surfaces 108 and 110. By virtue of this, the regions of the connection inner surfaces 108 and 110 can easily be recognized visually through the opening parts 100 and 111. Further, the connection inner surfaces 108 and 110 can be checked also by touching with the hand through the opening parts 100 and 111. Further, even when a balloon-shaped air bubble 81 (see FIG. 23) has been generated in the regions of the connection inner surfaces 108 and 110, the balloon-shaped air bubble 81 can easily be cut off with a tool such as a knife. In part, when the balloon-shaped air bubble 81 is to be cut off with a tool such as a knife, it is preferable that the shortest distance is 15 cm or smaller. By virtue of this, the balloon-shaped air bubble 81 can efficiently be cut off through the opening parts 100 and 111.

Further, in the instrument panel duct 1 of the present embodiment, it is preferable that construction is performed such that the aperture area of the opening part 100 of the fitting part 102 is set to be larger than the aperture area of the tube part 101. This permits easy visual recognition of the regions of the connection inner surfaces 108 and 110 through the opening part 100 of the fitting part 102. Further, the regions T1 and T2 where light projected through the opening part 100 is directly projected on the inner surface of the tube body X1 can be widened. Thus, the region where the flange 103 or the bridging part 104 may be provided can be widened. As a result, restrictions on the region where the flange 103 or the bridging part 104 is to be provided in the tube body X1 can be relaxed. In order that the aperture area of the opening part 100 of the fitting part 102 may be made larger than the aperture area of the tube part 101, this configuration can be achieved, for example, when the shape of the fitting part 102 is constructed in a trumpet shape. The trumpet shape indicates a shape in which the aperture area increases as going toward an open end.

Further, in the instrument panel duct 1 of the present embodiment, it is preferable that the width in the passage advancement direction of the connection portion where the flange 103 or the bridging part 104 is connected to the tube body X1 is set to be a width in accordance with the aperture area of the opening part 100 or 111 formed in the tube body X1. That is, when the aperture area of the opening part 100 or 111 is large, the region where the connection inner surface 108 or 110 can visually be recognized through the opening part 100 or 111 becomes large. Thus, it is preferable that when the aperture area of the opening part 100 or 111 is large, the width in the passage advancement direction of the connection portion is widened. Further, when the aperture area of the opening part 100 or 111 is small, the region where the connection inner surface 108 or 110 can visually be recognized through the opening part 100 or 111 becomes small. Thus, it is preferable that when the aperture area of the opening part 100 or 111 is small, the width in the passage advancement direction of the connection portion is reduced. For example, it is premised that there are three opening parts consisting of a first opening part, a second opening part, and a third opening part and then the aperture areas of the individual opening parts are such that the first opening part>the second opening part>the third opening part. In this case, the aperture area of the first opening part is the largest and hence the region where the connection inner surface 108 or 110 can visually be recognized through the first opening part becomes the largest. Further, the aperture area of the third opening part is the smallest and hence the region where the connection inner surface 108 or 110 can visually be recognized through the third opening part becomes the smallest. Thus, the width in the passage advancement direction of the connection portion constituting the connection inner surface 108 or 110 which can visually be recognized through the first opening part is set to be the largest. Further, the width in the passage advancement direction of the connection portion constituting the connection inner surface 108 or 110 which can visually be recognized through the third opening part is set to be the smallest. As a result, the flange 103 or the bridging part 104 having the largest width in the passage advancement direction of the connection portion is provided in the first opening part, and the flange 103 or the bridging part 104 having the smallest width in the passage advancement direction of the connection portion is provided in the third opening part. When the flange 103 and the bridging part 104 are provided in the tube body X1 in accordance with the aperture area of each opening part, the instrument panel duct 1 can easily be fixed to another tubular member and, at the same time, the regions of the connection inner surfaces 108 and 110 which are the inner sides of the tube body X1 where the tube body X1 and the flange 103 or the bridging part 104 are connected can visually be recognized through the opening parts 100 and 111.

Here, the embodiments given above are preferred embodiments of the present invention and the present invention is limited to these and may be implemented with being modified variously in accordance with the spirit of the present invention.

DESCRIPTION OF REFERENCE NUMERALS

1 Instrument panel duct (example of foam molded article)
101 Tube part
102 Fitting part
103 Flange
104 Bridging part
105 Supply port 106, 109 Connection outer surface
107 Fixing hole
108, 110 Connection inner surface
100, 111 Opening part
10a, 10b Cavity
11 Annular dice
12a, 12b Split metallic mold
13 Foamed parison
14 Blow-in needle
15 Blow-out needle
16 Regulator
17 Back pressure regulator
A, B, C, F Passage direction
20 Hydraulic motor
21 Hopper
22 Cylinder
24 Accumulator
26 Plunger
28 T-die
29 Die bolt
30 Adjustment roller
50 Extruding machine
X1 Tube body
Y1 Plate-shaped part
Z Pressing force by mold clamping

What is claimed is:

1. A foam molded article made of a foamed resin and having a single foam layer comprising:
a hollow tube body having a tubular shape, the tube body having an opening part provided in the tube body; and
at least one plate-shaped part having a plate shape,
the at least one plate-shaped part being connected to an outside of the tube body,
the at least one plate-shaped part including one end and the other end, the one end being connected to the tube body, the other end being not connected to the tube body,
the at least one plate-shaped part projecting from the outside of the tube body,
the at least one plate-shaped part provided on a part less than an entire length parallel to a tube axis of the tube body, and
the at least one plate-shaped part formed of a compressed pair of opposed portions of the foamed resin, wherein the tube body has elliptic bubbles flattened in a direction perpendicular to a thickness direction of the foam molded article,
being divided into two equal parts in a thickness direction of the single foam layer, an average inner cell diameter of the elliptic bubbles in the thickness direction on an inner surface side of the single foam layer is 1.2 times or greater than an average outer cell diameter of the elliptic bubbles in the thickness direction on an outer surface side of the single foam layer such that the elliptical bubbles on the outer surface side of the single foam layer are flatter than the elliptical bubbles on the inner surface side of the single foam layer; and a surface roughness Sm of the inner surface of the foam molded article is 1000 μm or greater.

2. The foam molded article according to claim 1, wherein the at least one plate-shaped part is one plate-shaped part of a plurality of plate-shaped parts that are connected to the outside of the tube body, and
a connection inner surface on an inner side of the tube body corresponding to positions where the plurality of plate-shaped parts are connected can visually be recognized through the opening part.

3. The foam molded article according to claim 2, wherein a shortest distance obtained when an arbitrary portion of the connection inner surface is joined by a straight line to an arbitrary portion of the opening part through which light can reach the arbitrary portions of the connection inner surface is 30 cm or smaller in all portions of the connection inner surface.

* * * * *